United States Patent
Nakamura et al.

Patent Number: 6,034,334
Date of Patent: *Mar. 7, 2000

[54] METHOD OF AND MEANS FOR CORRECTING EFFECTS OF FLOOR VIBRATIONS ON WEIGHT SIGNALS FROM A WEIGHING MACHINE

[75] Inventors: Yoshihiro Nakamura; Yukio Wakasa; Kazufumi Naito; Hidekatsu Tokumaru; Shoko Tajiri, all of Shiga, Japan

[73] Assignee: Ishida Co. Ltd., Kyoto, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/421,491

[22] Filed: Apr. 12, 1995

Related U.S. Application Data

[63] Continuation-in-part of application No. 08/233,585, Apr. 26, 1994, abandoned, and application No. 08/294,470, Aug. 23, 1994, abandoned.

[30] Foreign Application Priority Data

Apr. 12, 1994 [JP] Japan ..................................... 6-099197

[51] Int. Cl.$^7$ ........................... G01G 13/00; G01G 23/10
[52] U.S. Cl. ........................ 177/25.18; 177/185; 702/173
[58] Field of Search ........................ 177/1, 25.11, 25.12, 177/25.13, 25.14, 25.18, 50, 185; 73/1.13; 364/567, 571.01–571.08, 572, 574; 702/101, 102, 173, 175

[56] References Cited

U.S. PATENT DOCUMENTS

| | | | |
|---|---|---|---|
| 4,466,500 | 8/1984 | Mosher et al. | 177/1 |
| 4,529,050 | 7/1985 | Mosher et al. | 177/1 |
| 4,624,331 | 11/1986 | Naito | 177/185 |
| 4,694,920 | 9/1987 | Naito et al. | 177/25.18 |
| 4,705,126 | 11/1987 | Naito | 177/50 |
| 4,751,973 | 6/1988 | Freeman et al. | 177/185 |
| 4,762,252 | 8/1988 | Hyer et al. | 177/50 |
| 4,804,052 | 2/1989 | Griffen | 177/25.14 |
| 4,909,338 | 3/1990 | Vitunic et al. | 177/50 |
| 4,926,359 | 5/1990 | Konishi et al. | 364/567 |
| 5,117,929 | 6/1992 | Nakamura et al. | 177/185 |
| 5,166,892 | 11/1992 | Inoue et al. | 364/567 |
| 5,172,783 | 12/1992 | Feinland et al. | 177/185 |

*Primary Examiner*—Randy W. Gibson
*Attorney, Agent, or Firm*—Majestic, Parsons, Siebert & Hsue P.C.

[57] ABSTRACT

A weighing machine, such as a combinational weighing machine, has scale cells and a plurality of dummy cells installed on the same floor. The scale cells output weight signals corresponding to the weights of objects being loaded. The mode of vibrations of the floor is detected from dummy signals from the dummy cells, vertical displacements of the floor at the positions of the scale cells are calculated, and their effects are eliminated from the weight signals. Those of the scale cells not selected after a cycle of combinational calculations can be used as dummy cells in the next cycle. A memory device may be provided to store preferred combinations of such scale cells not selected that may be used for this purpose. Effects of the floor vibrations can be eliminated more accurately if the differences in sensitivity among the cells due to physical characteristics of the individual cells and/or due to the different loads on them can be taken into account either by a feedback calculation or by a formula.

13 Claims, 12 Drawing Sheets

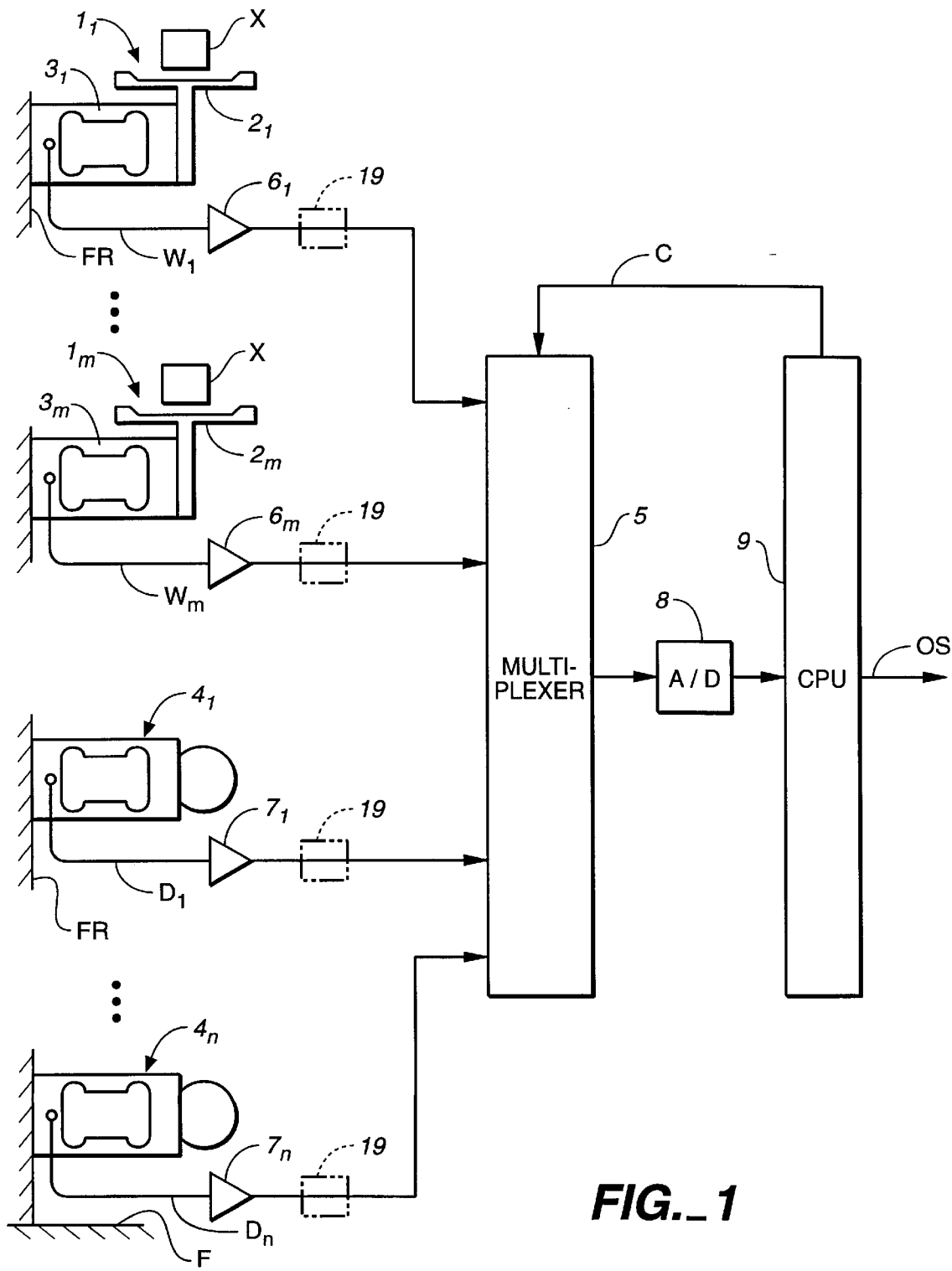
FIG._1

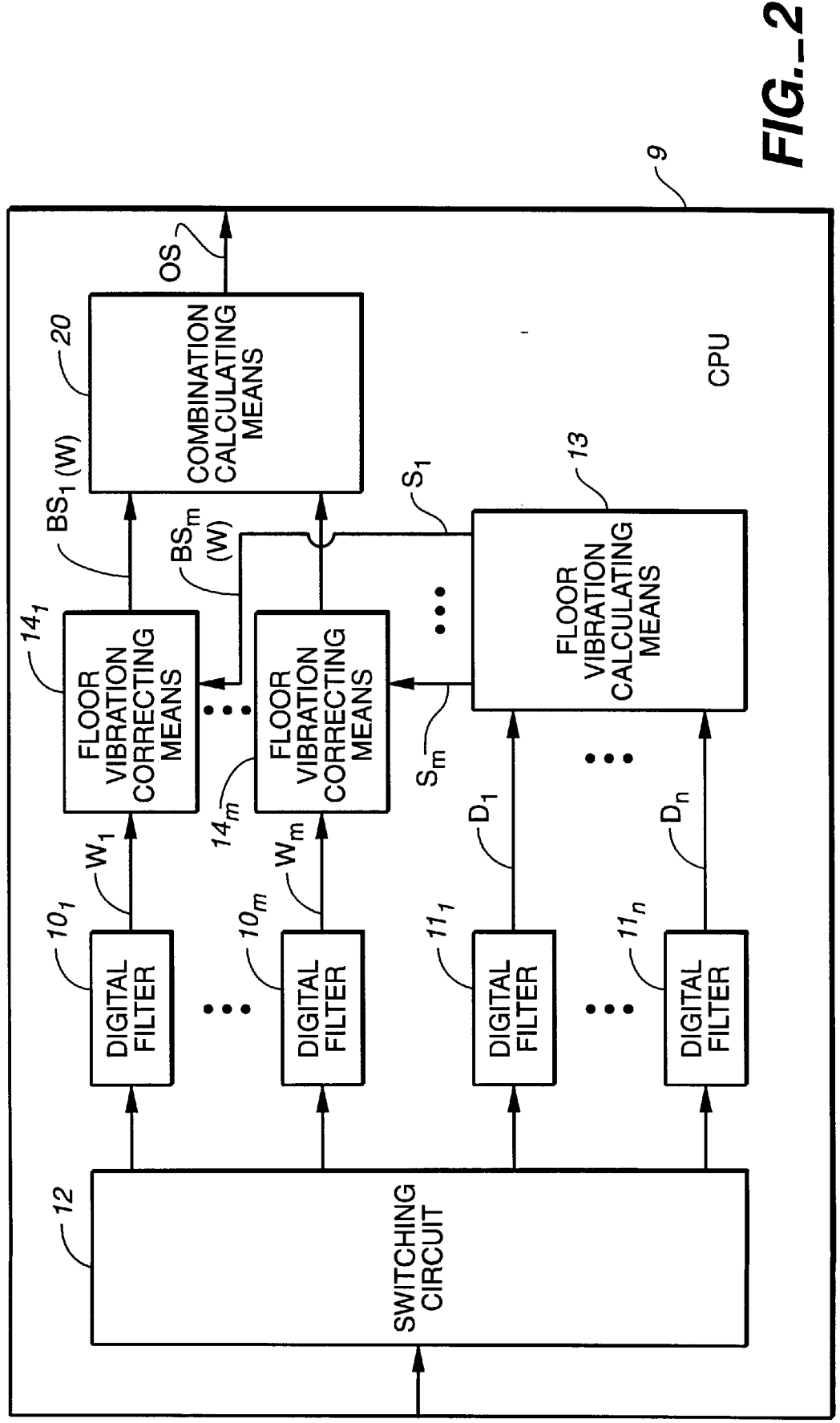
FIG._2

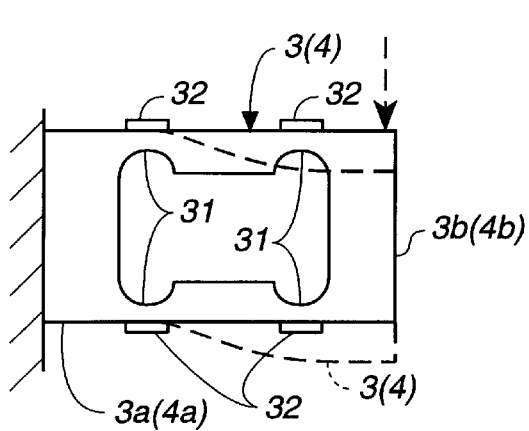
FIG._3
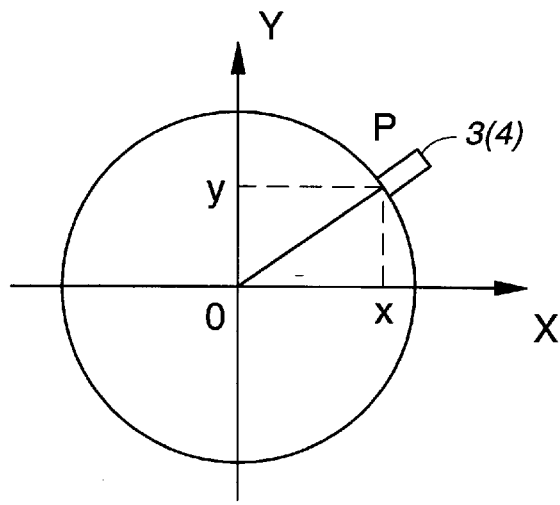
FIG._4
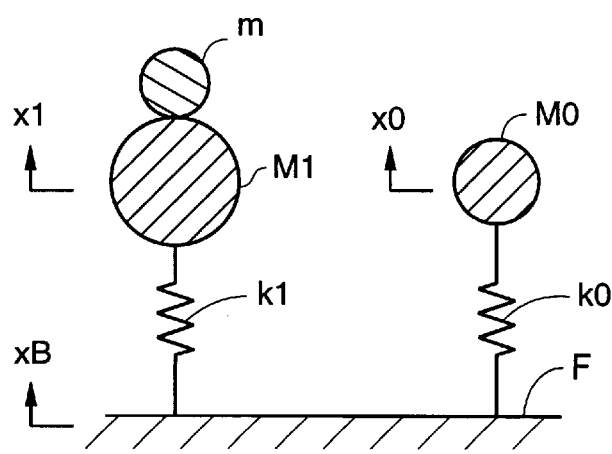
FIG._6

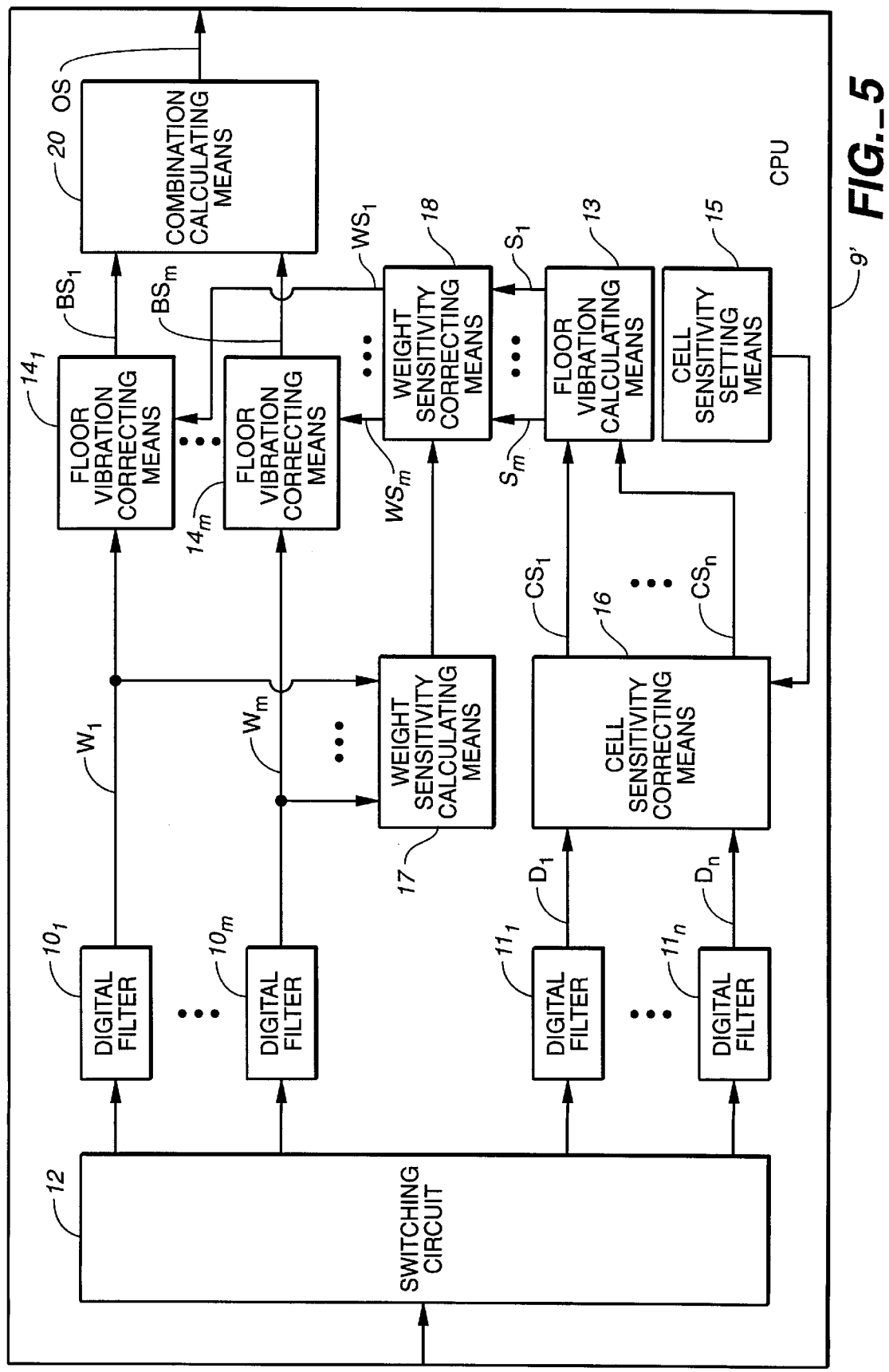
FIG._5

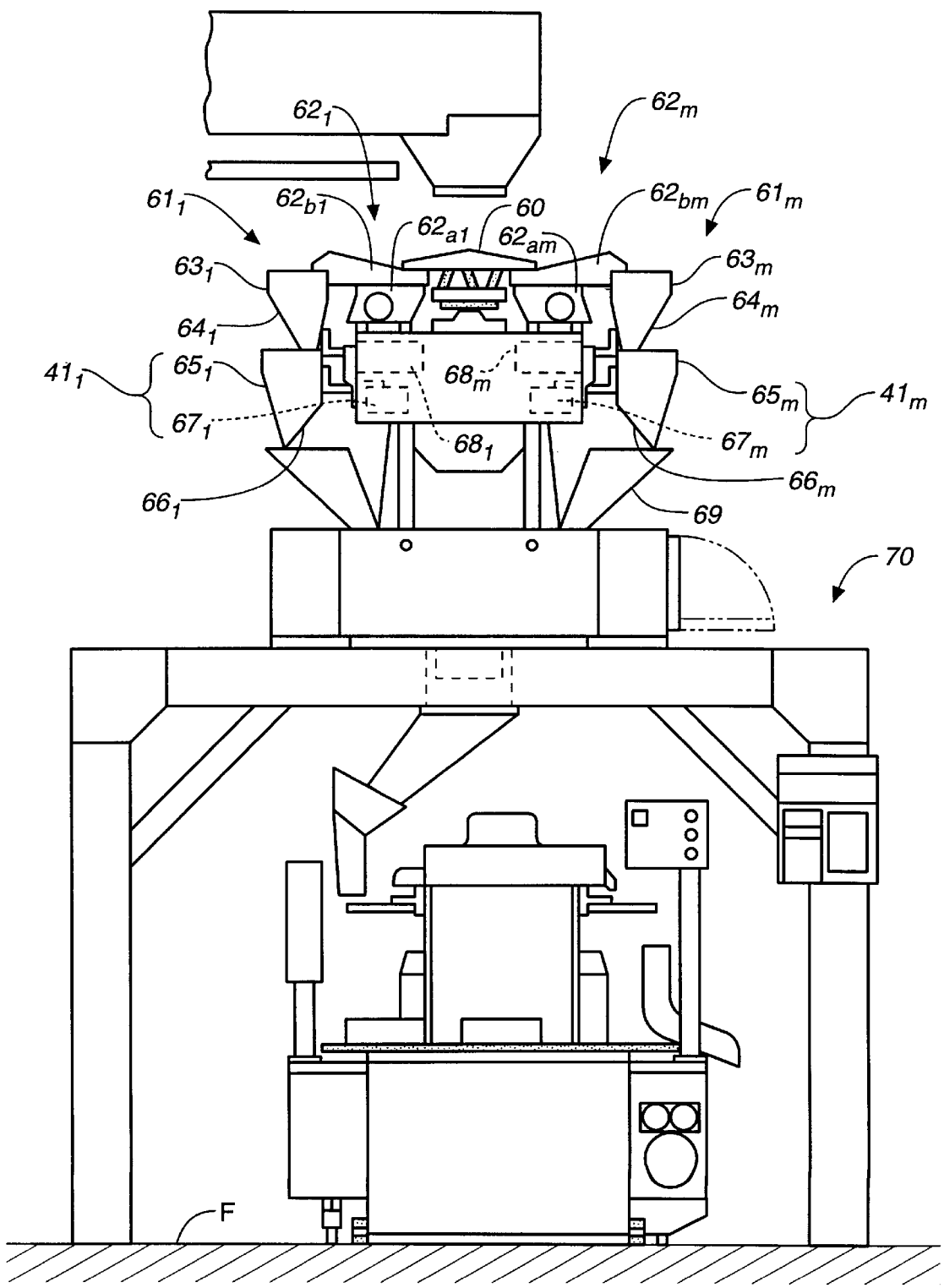
FIG._7

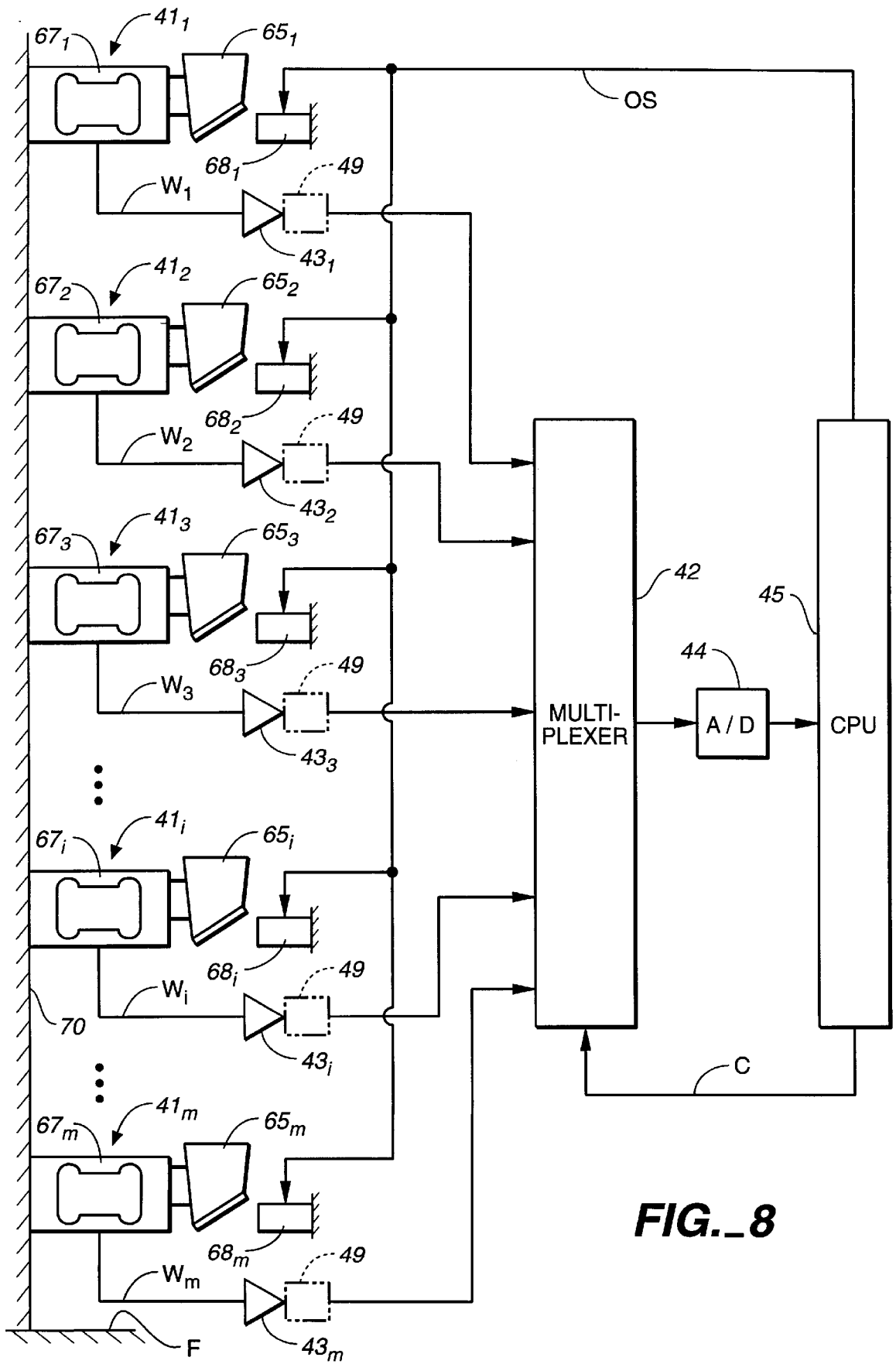
FIG._8

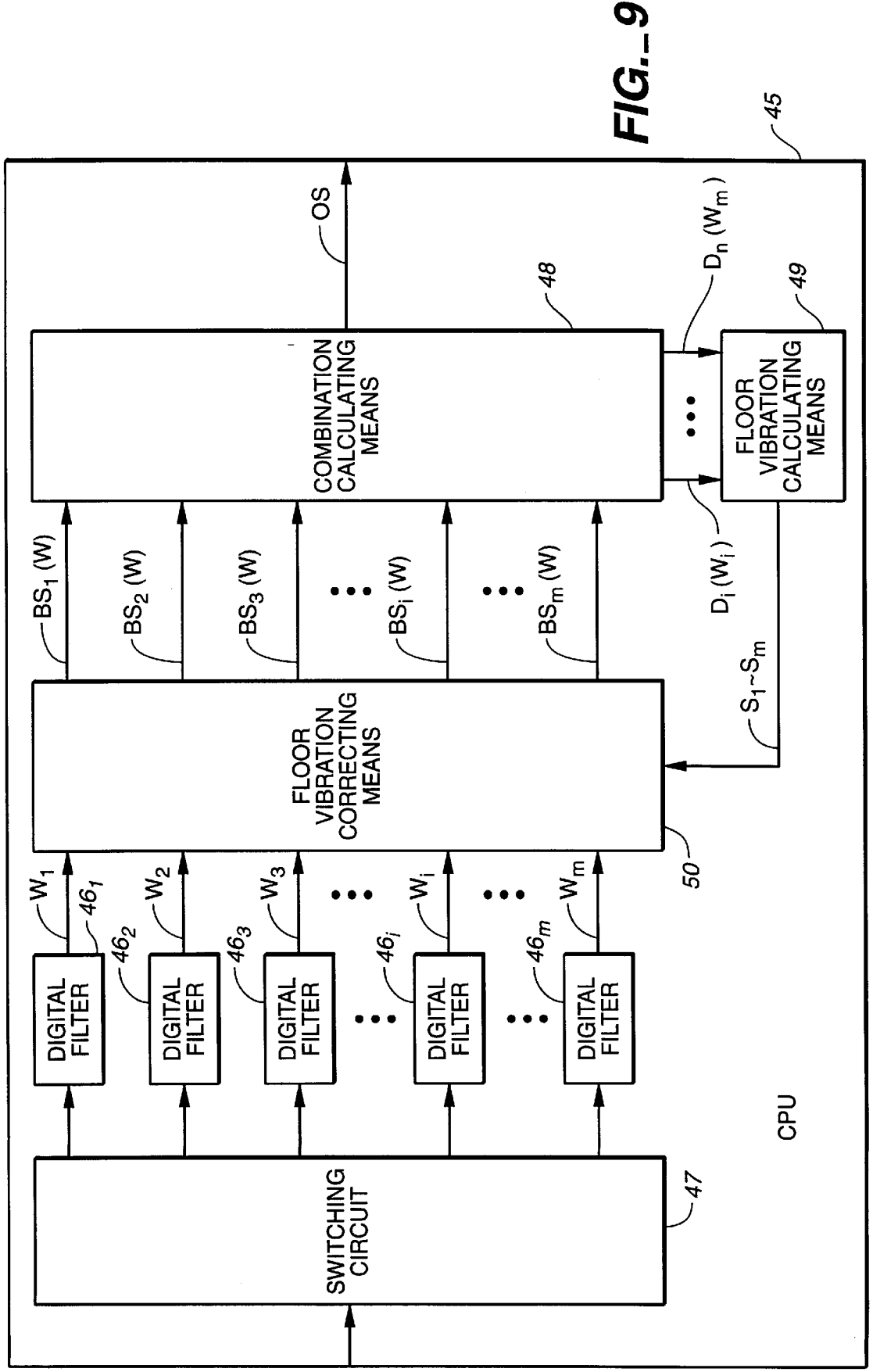

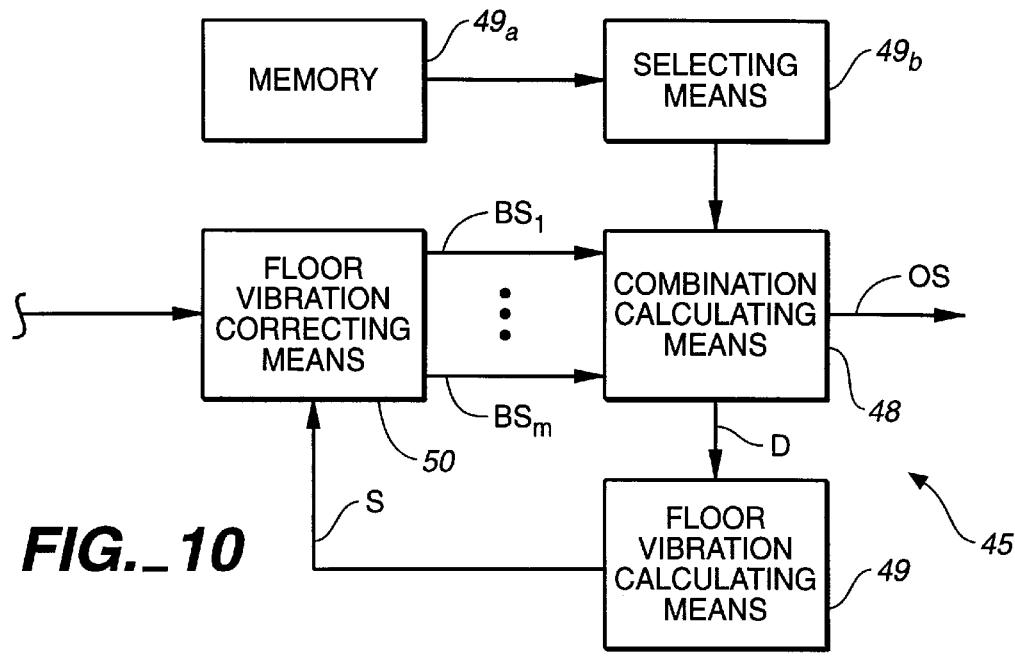
FIG._10
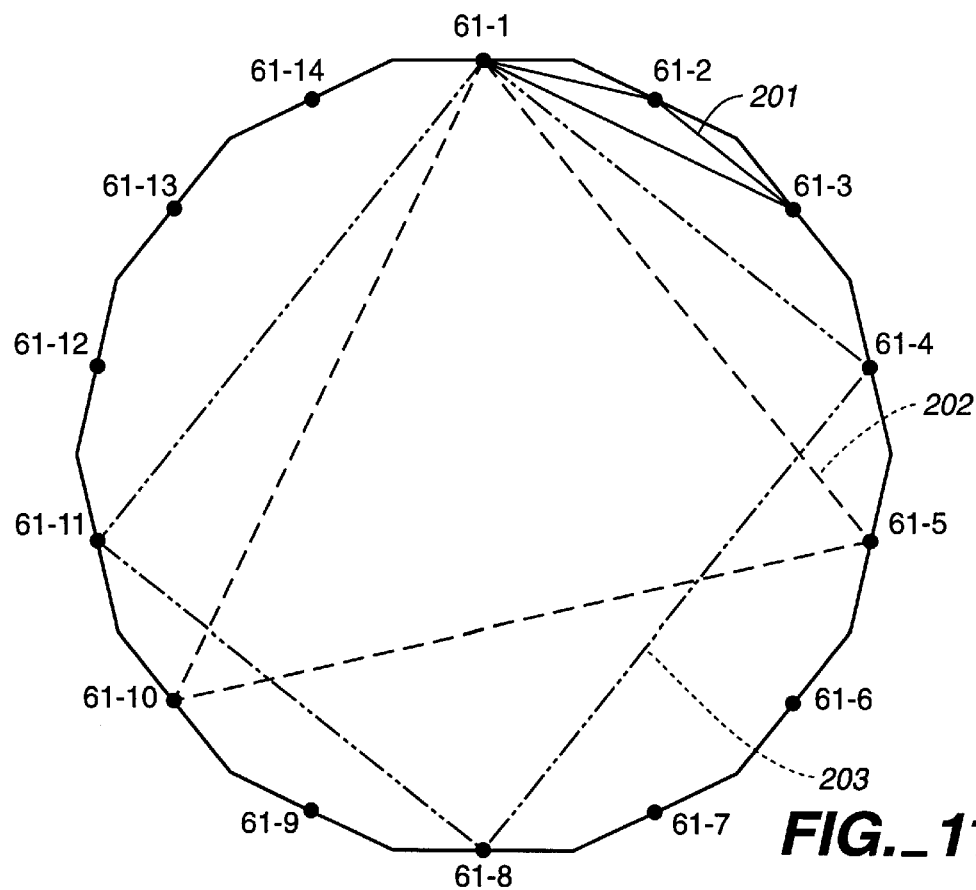
FIG._11

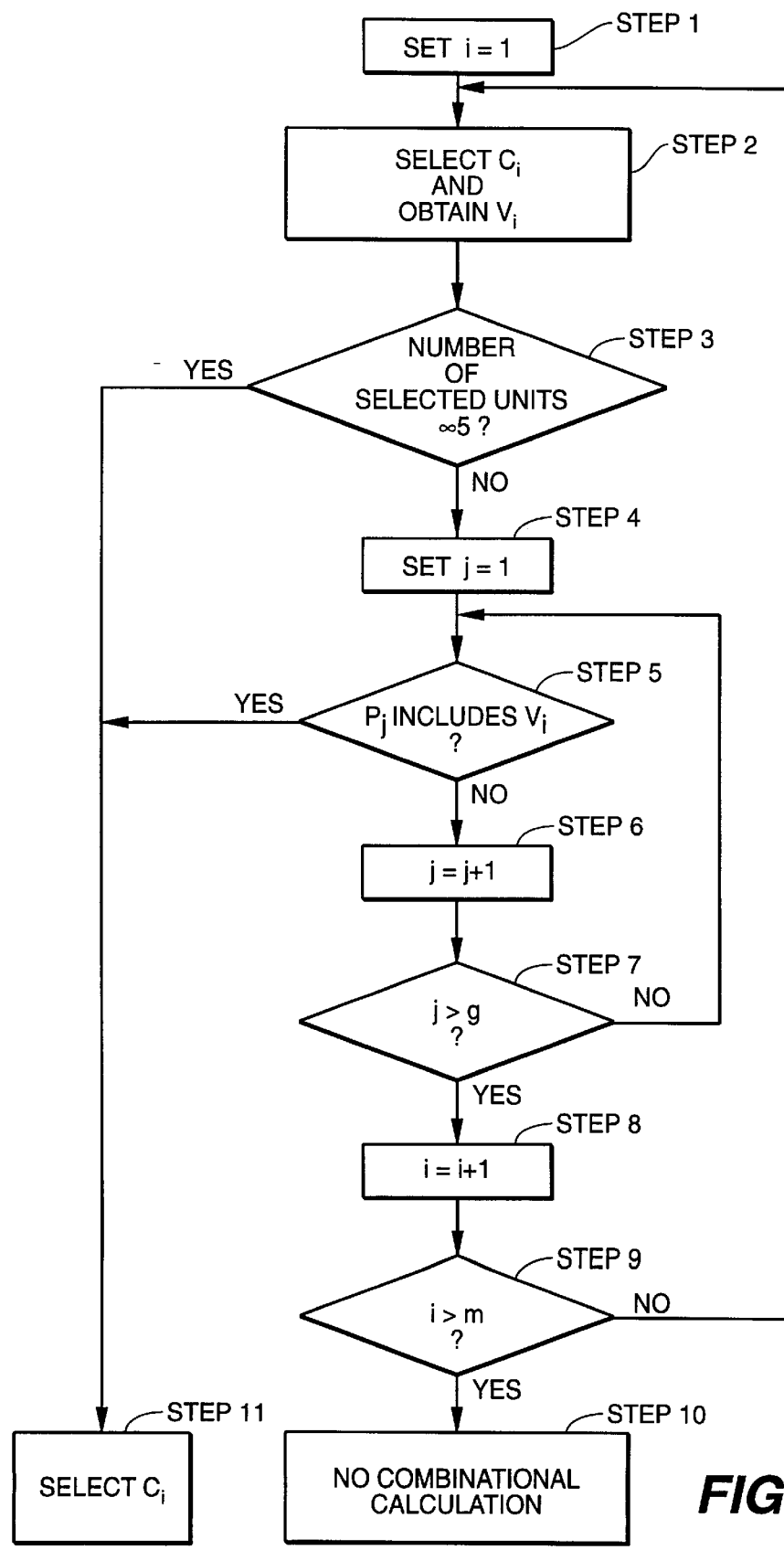
FIG._12

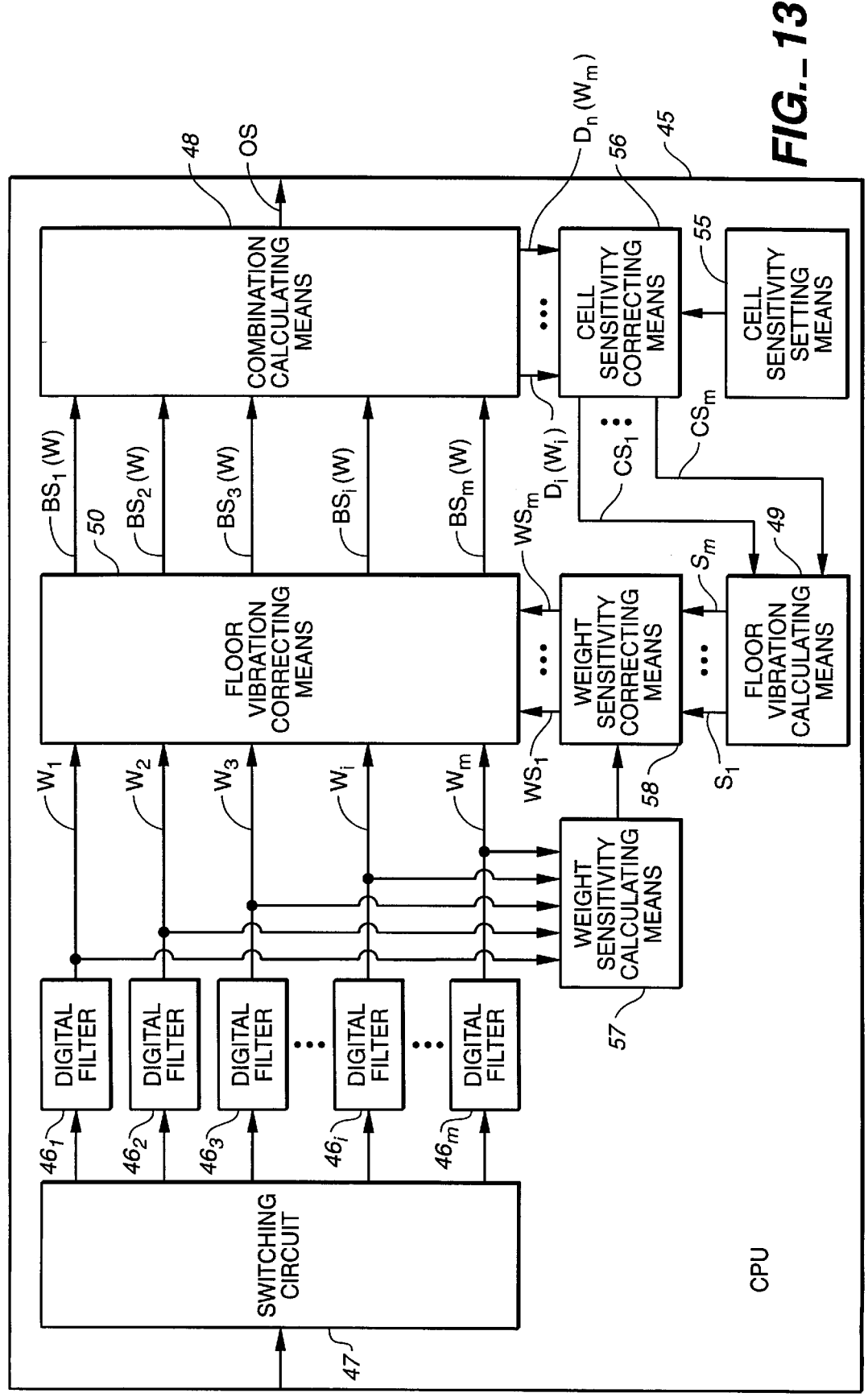
FIG._13

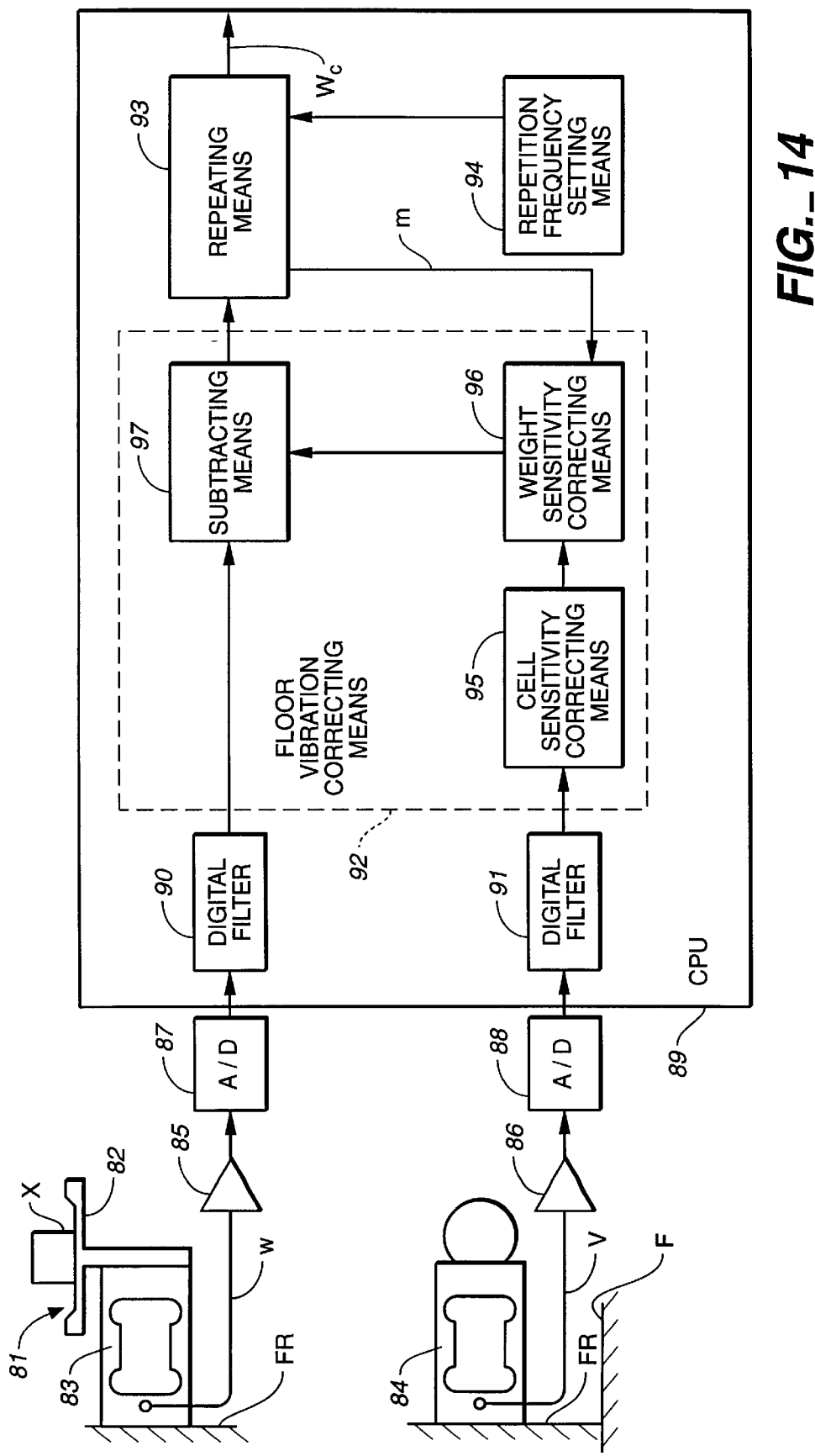

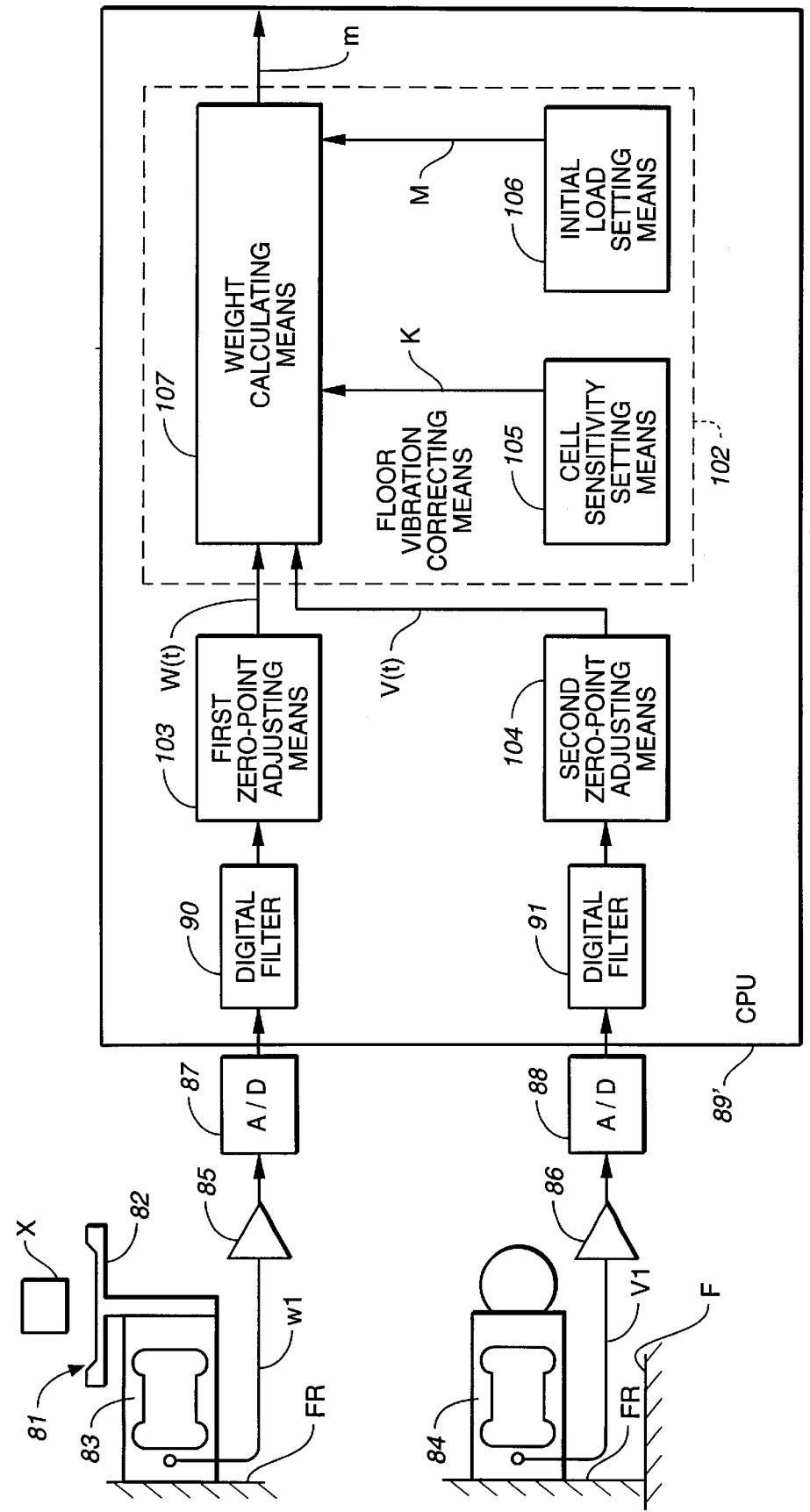
FIG._15

METHOD OF AND MEANS FOR CORRECTING EFFECTS OF FLOOR VIBRATIONS ON WEIGHT SIGNALS FROM A WEIGHING MACHINE

This is a continuation-in-part of application Ser. No. 08/233,585 filed Apr. 26, 1994, now abandoned, and of application Ser. No. 08/294,470, filed Aug. 23,1994, which is now abandoned and is herein incorporated by reference.

BACKGROUND OF THE INVENTION

This invention relates to weighing machines using load sensors such as load cells set on a floor to measure the weight of articles such as food items and industrial machine parts. More particularly, the invention relates to methods of and means for correcting the effects of lower-frequency floor vibrations on weight signals generated and processed by such a weighing machine. This invention further relates to a combinational weighing machine adapted to select a preferred combination of scale cells not selected in the preceding cycle of combinational computations for calculating the vertical displacements of the floor.

Floor vibrations usually have lower frequencies than the vibrations caused by an object as it is placed on a weighing machine to be weighed. Thus, it may be thought that a filter can be used to eliminate such lower-frequency vibrations from the weight signals, but the cutoff frequency of the filter must be set low, and this makes the filtering time longer, adversely affecting the speed of weight measurements. U.S. Pat. No. 4,624,331 disclosed a weighing machine having not only a scale cell for measuring the weight of an object and outputting a weight signal indicative of the measured weight, but also a dummy cell set on the same floor as the scale cell such that the effects of the floor vibrations can be eliminated from the weight signal by inverting the dummy signal outputted from the dummy cell and adding it to the weight signal from the scale cell. In this manner, the cutoff frequency of the filter can be set higher, and hence the weighing speed is not reduced.

With a prior art weighing machine of this type, however, the scale cell and the dummy cell must be set close to each other because the floor at the positions of the two cells is assumed to be vibrating under the same conditions. If the conditions of vibrations are different at the positions of the cells, corrections cannot be effected accurately by subtracting the dummy signal of the dummy cell from the weight signal. There may even be situations where the error becomes magnified by the "correction". In short, the choice of the position for installing the dummy cell becomes extremely limited, and the degree of freedom in designing the weighing machine is reduced. If there is not much free space in the neighborhood of the scale cell, in particular, it is extremely difficult to find an adequate place for installing the dummy cell for this purpose. It now goes without saying that the difficulty of this kind is magnified in the case of a combinational weighing machine having a plurality of scale cells and calculating combinations of weight signals therefrom to select a particular combination satisfying a predetermined criterion because each of a large number (such as 10 or 14) of scale cells will have to be provided with a dummy cell associated therewith. Moreover, this has the adverse effects of making the machine large and complicated in structure.

When such a combinational weighing machine with a plurality of weighing units each associated with a scale cell is operated, those of the weighing units which were not selected in the preceding cycle of combinational calculations do not discharge their load and do not receive a new article batch. This means that they are not subjected to a force associated with the loading of a new article batch for the next cycle and hence that the vibration components of their signals are now mainly due to the vibration of the floor on which the weighing machine is installed. For this reason, it has been known in association with combinational weighing machines to make use of the vibration components of weight signals outputted from un-selected weighing units for detecting the mode of vibration of the floor and subtracting the effects of the floor vibration from the measured weight values. With prior art combinational weighing machines of this kind, however, there can be situations where those of the un-selected weighing units used for the detection of floor vibration mode are situated inconveniently with respect to one another such that the area of the portion of the floor formed thereby is small and relatively far from positions of interest. In such a situation, the calculated floor vibration component based on such a small area may be significantly different from the real floor vibration component. In other words, the effects of the floor vibration cannot always be determined accurately or subtracted with a prior art combinational weighing machine of this type.

Japanese Patent Publication Tokkai 64-32122 disclosed a combinational weighing machine adapted to determine the vibration characteristics of the floor from the average of weight signals outputted from those load sensors not selected in the preceding cycle of combinational calculations and to thereby correct the signals outputted from the selected load sensors. This correction routine is based, however, on the assumption that the floor vibrations are identical at the positions of the plurality of load sensors. If this assumption does not hold, the effects of floor vibrations cannot be eliminated accurately by subtracting such an average value.

Another problem with prior art methods using a scale cell in combination with another cell for detecting the floor vibrations relates to the difference in sensitivity between the two cells. In other words, signal levels from these two cells are usually different even if they are subjected to identical loads. This difference in sensitivity is due not only to the material, shape, size and fabrication conditions of the cells (or sensitivity difference characteristically of the cells) but also to the difference in the load. By prior art correction methods by subtracting the signal indicative of the floor vibrations from the weight signal only the sensitivity difference characteristically of the cells (hereinafter referred to as the cell sensitivity) was corrected. This was in part because the weight of the target object, which is to be determined, is a part of the load on the scale cell and is basically an unknown. Since the load on the scale cell may be very different from the load on the vibration-detecting cell, however, prior art correction methods ignoring the sensitivity differences due to difference in load (hereinafter referred to as the weight sensitivity) cannot be accurate. Accuracy in measurements is believed to decline as the weight of the object being weighed increases.

In view of the above, it is an object of the invention to provide a weighing machine capable of accurately removing the effects of floor vibrations from weight signals to thereby yield highly accurate results of weighing.

It is another object of the invention to provide such a weighing machine with an increased degree of structural freedom regarding the positions at which dummy cells can be installed.

It is still another object of the invention to provide such a weighing machine that can be made compact and to cost less.

It is still another object of the invention to provide a weighing machine which does not require any extra dummy cells or amplifiers therefor but is still capable of accurately removing the effects of floor vibrations from weight signals even in situations where the conditions of vibrations are different at the positions of its load sensors.

It is a further object of the invention to provide methods of and means for accurately and quickly removing the effects of floor vibrations on weight values obtained by a weighing machine independent of the size of the weight of the object being weighed.

SUMMARY OF THE INVENTION

A weighing machine embodying the invention, with which some of the above objects can be accomplished, may be characterized as comprising scale cells for measuring the weights of objects and outputting weight signals indicative of their weights, a plurality of dummy cells installed on the same floor as the scale cells, a floor vibration calculating means for detecting the mode of the floor vibrations from the vibration components of dummy signals outputted from these dummy cells to thereby calculate the vertical displacements of the floor at the positions of the scale cells, and a floor vibration correcting means for generating vibration corrected signals by removing the vibration components of the floor from the weight signals on the basis of these calculated displacements. Such a weighing machine may preferably also comprise a cell sensitivity setting means for setting cell sensitivity ratio at least between the scale cells and the dummy cells (and possibly also among the scale cells and among the dummy cells) on the basis of the loads on the dummy cells and those of the scale cells when not carrying any object to be weighed and the spring constants of the scale and dummy cells, and also a cell sensitivity correcting means for generating cell sensitivity corrected signals to correct at least a weight signal or a dummy signal by using the aforementioned cell sensitivity ratio. Still more preferably, such a weighing machine may additionally comprise a weight sensitivity calculating means for calculating weight sensitivity ratio at least between the scale cells and the dummy cells (and possibly also among the scale cells) corresponding to the weight of the object to be weighed and a weight sensitivity correcting means for generating weight sensitivity corrected signals by using the aforementioned weight sensitivity ratio to correct at least either the weight or dummy signals.

With a weighing machine thus structured, the vibration modes of the floor at the positions of the scale cells are detected by the dummy cells, and the vertical displacements of the floor at these positions are calculated and used for correcting the weight signals. Accordingly, the weight signals can be accurately corrected even if the vibrating conditions of the floor are different at the positions of the scale and dummy cells. In other words, the dummy cells do not have to be necessarily installed close to the scale cells, and hence the degree of structural freedom of the weighing machine is improved. With the cell sensitivity correcting means, generation of errors due to differences in sensitivity of the cells can be prevented and the accuracy in correction can be improved. With the weight sensitivity calculating means, generation of errors due to changes in sensitivity due to the weight of the object being weighed can also be prevented and the accuracy in correction can be further improved.

Another weighing machine according to a second embodiment of the invention may be characterized as being a combinational weighing machine comprising a floor vibration calculating means which uses weight signals not selected in the preceding cycle of combinational calculations as dummy signals and detecting the vibration modes of the floor on the basis of the vibration components of these dummy signals to calculate the vertical displacements of the floor at the positions of the load sensors. As explained above, a weighing machine according to the second embodiment of the invention may preferably also comprise a cell sensitivity correcting means for generating cell sensitivity corrected signals and, more preferably, also a weight sensitivity calculating means for generating weight sensitivity corrected signals. The main advantage of a combinational weighing machine according to the second embodiment of the invention thus characterized is that neither dummy cells structured identically to the scale cells nor amplifiers therefor are needed for eliminating the effects of floor vibrations and hence that the cost of the weighing machine can be reduced. The dummy signals are used to calculate the vertical displacements of the floor as explained above regarding a weighing machine according to the first embodiment of the invention. Cell sensitivity correcting means and weight sensitivity calculating means similarly contribute to further improving the accuracy in the corrections.

The invention also relates to a correction method whereby, when the effect of floor vibrations detected by a vibration-detecting cell is eliminated from a weight signal from a scale cell, the difference in weight sensitivity between the two cells caused by the weight of the object being weighed is corrected, and this feedback correction process is repeated by using the weight value of the object obtained by both the weight sensitivity correction and the floor vibration correction. For this purpose, a weighing machine may be characterized not only as comprising a scale cell, a vibration-detecting cell (an equivalent of the aforementioned dummy cell) and a floor vibration correcting means for eliminating the effects of floor vibrations detected by the vibration-detecting cell from a weight signal outputted from the scale cell, but also wherein this floor vibration correcting means includes a weight sensitivity correcting means for correcting the difference in sensitivity between the two cells due to the weight of the object being weighed and a repeating means for inputting the weight value of this object after it is corrected by the floor vibration correcting means into the weight sensitivity correcting means to thereby repeat the correction of the weight sensitivity. By this method, not only is the difference in weight sensitivity corrected between the cells, but also this correction process is repeated by using the weight value of the object being weighed thus corrected. Thus, the accuracy in the correction of the weight sensitivity is improved.

According to still another embodiment of the invention, the floor vibration correcting means serves to eliminate the effects of floor vibrations obtained from the vibration-detecting cell from the weight value of the object being weighed contained in the weight signal when the weight of this object has been added, and this floor vibration correcting means comprises a cell sensitivity setting means for setting the sensitivity ratio K between the scale cell when the weight of the object is not added and the vibration-detecting cell, an initial load setting means for setting an initial load value M for the scale cell when the weight of the object is not applied, and a weight calculating means for calculating the weight m of the object by a formula rather than by carrying out a time-consuming feedback process.

BRIEF DESCRIPTION OF THE DRAWINGS

The accompanying drawings, which are incorporated in and form a part of this specification, illustrate several embodiments of the invention and, together with the description, serve to explain the principles of the invention. In the drawings:

FIG. 1 is a block diagram of a signal processing system according to a first embodiment of the invention for a combinational weighing machine;

FIG. 2 is a block diagram of the CPU of FIG. 1;

FIG. 3 shows the shape and deformation of a load cell for explaining the theory of AFV (anti-floor vibration) technology;

FIG. 4 shows the positioning of the load cell of FIG. 3;

FIG. 5 is a block diagram of another CPU according to the invention which may be used in place of the CPU shown in FIG. 2;

FIG. 6 is a model of oscillating system which is equivalent to FIG. 5;

FIG. 7 is a schematic side view of a combinational weighing machine to which the present invention can be applied;

FIG. 8 is a block diagram of a signal processing system according to a second embodiment of the invention for a combinational weighing machine structured as shown in FIG. 7;

FIG. 9 is a block diagram of the CPU of FIG. 8;

FIG. 10 is a block diagram of a portion of a CPU as shown in FIG. 9 according to another embodiment of the invention;

FIG. 11 is a schematic plan view of a combinational weighing machine for showing the arrangement of its weighing units;

FIG. 12 is a flow chart for the operation of the signal processing system of FIG. 10 for the combinational weighing machine arranged as shown in FIG. 11;

FIG. 13 is a block diagram of another CPU which may be used in place of the CPU shown in FIG. 9;

FIG. 14 is a block diagram of a signal processing system for a weighing machine according to a third embodiment of the invention; and FIG. 15 is a block diagram of a signal processing system according to a fourth embodiment of the invention.

DETAILED DESCRIPTION OF THE INVENTION

In what follows, the invention is described more in detail by way of some specific examples. With reference first to FIG. 1 which represents a signal processing system according to a first embodiment of the invention for a combinational weighing machine, there are a plural m-number of load sensors $1_1$–$1_m$ each comprising a weigh hopper $2_1$–$2_m$ and a scale cell $3_1$–$3_m$ such that objects $X_1$–$X_m$ placed in the weigh hoppers $2_1$–$2_m$ are weighed respectively by the corresponding ones of the scale cells $3_1$–$3_m$ and analog weight signals $W_1$–$W_m$ representing their weights are outputted. There are also a plural n-number of dummy cells $4_1$–$4_n$ installed through frames FR on the same floor F as the scale cells $3_1$–$3_m$, being adapted to output analog dummy signals $D_1$–$D_n$ caused by the floor vibrations. The dummy cells $4_1$–$4_n$ may be installed either on the frames for the weighing machine or on separately prepared frames.

The analog weight signals $W_1$–$W_m$ outputted from the load sensors $1_1$–$1_m$ are amplified by amplifiers $6_1$–$6_m$ and inputted into a multiplexer 5. The dummy signals $D_1$–$D_n$ from the dummy cells $4_1$–$4_n$ are also amplified by amplifiers $7_1$–$7_n$ and inputted into the same multiplexer 5. The signals $W_1$–$W_m$ and $D_1$–$D_n$, selectively outputted from the multiplexer 5 in response to a switch signal c from a CPU 9, are converted into digital signals by an analog-to-digital (A/D) converter 8.

The CPU 9, which also serves as a calculating means, carries out vibration corrections and combinational calculations by using the digital weight and dummy signals $W_1$–$W_m$ and $D_1$–$D_n$ received through the A/D converter 8 and outputs open signals OS for selectively opening a combination of weigh hoppers $2_1$–$2_m$ which satisfies a preset criterion (such as having the total weight closest to a preset target weight value). Low frequency floor vibration components are thus eliminated such that the cutoff frequency of filters (to be explained below) can be set relatively high and the weighing speed can be improved.

With reference next to FIG. 2, the CPU 9 contains digital filters $10_1$–$10_m$ and $11_1$–$11_n$. The weight and dummy signals $W_1$–$W_m$ and $D_1$–$D_n$, which are selectively outputted from the multiplexer 5 and converted into digital signals by the A/D converter 8, are passed through a switching circuit 12 and corresponding one of the digital filters $10_1$–$10_m$ and $11_1$–$11_n$ such that their components with relatively high frequencies, generated principally when objects X to be weighed are put inside the weigh hoppers $2_1$–$2_m$, are eliminated.

The CPU 9 also includes a floor vibration calculating means 13 for detecting the vibration mode of the floor on the basis of the digital dummy signals $D_1$–$D_n$ received through the filters $11_1$–$11_n$, calculating therefrom the vertical displacements of the floor at the positions of the scale cells $1_1$–$1_m$ and outputting displacement signals $S_1$–$S_m$ indicative of these calculated vertical displacements of the floor. These displacement signals $S_1$–$S_m$ are respectively received by floor vibration correcting means $14_1$–$14_m$ for respectively correcting the digital weight signals $W_1$–$W_m$ received respectively through the filters $10_1$–$10_m$. In other words, the effects of the vibrations represented by the displacement signals $S_1$–$S_m$ are subtracted from the measured weight values represented by the weight signals $W_1$–$W_m$ to generate and output vibration corrected weight signals $BS_1$–$BS_m$. Low frequency components of the floor vibrations are thus corrected, and this makes it possible to set the cutoff frequencies of the filters $10_1$–$10_m$ relatively high and to allow speedy weighing operations. The vibration corrected weight signals $BS_1$–$BS_m$ thus outputted are received by a combination calculating means 20 for selecting a particular combination thereof in view of a preset criterion such that the total weight represented by such combination be the closest to a preset target weight value, and outputting an selection signal (or open signal) OS to open those of the weigh hoppers $2_1$–$2_m$ corresponding to the selected combination. Since the correction operations are carried out digitally according to the illustrated example, more accurate corrections are possible than if they are done by using analog circuits among which there tend to be individual fluctuations.

In general, a method, such as the one described above, of detecting the vibration modes of a floor and canceling the vibration components of scale cells at arbitrary positions thereon is referred to as a multi-point AFV (anti-floor vibration) process. A new AFV system, as well as principles therefor, has been described in detail in a publication entitled "New weighing System for Anti-Floor Vibration" and published in Proceedings of the 1993 JSME International Conference of Advanced Mechatronics (August, 1993). This publication is herein incorporated by reference, and detailed explanation of the principles of the AFV will not be repetitiously presented in what follows. If the scale cells are distributed two-dimensionally (say, on a horizontal plane), floor vibrations are detected by dummy cells at three or more positions on the plane not in collinear relationship, the vibration modes of the floor are detected from the vibrations detected thereby, and the vibration components of the floor at arbitrary positions of the scale cells are obtained therefrom and subtracted from the weight values being outputted from the scale cells. If the scale cells are distributed one-dimensionally (say, on a single horizontal line), floor vibrations are detected by dummy cells at two or more different positions on the line, and the vibration components of the floor at the arbitrary positions of the scale cells are similarly obtained and subtracted from the weight values being outputted from the scale cells.

FIG. 3 shows the structure of a load cell 3(4) used as the scale and dummy cells $3_1$–$3_m$ and $4_1$–$4_n$ in the weighing machine described above. A load cell 3(4) of this type is provided with four strain gauges 32 attached individually near one of four notches 31 formed in a central opening therethrough to detect its deformation in terms of the strains measured thereby. These four strain gauges 32 form a Wheatstone bridge (not shown) which is adapted such that its output changes only if the load cell 3(4) is deformed into a parallelogram as shown by a broken line. In other words, there is no change in its output if the load cell 3(4) undergoes any other kind of deformation. Thus, when there is a relative deformation between the fixed side 3a(4a) of the load cell 3(4) where it is attached to the floor and the free side 3b(4b) where a load is applied (indicated by an arrow), only the component of a parallelogrammic deformation is detected. When such load cells 3(4) are used in a combinational weighing machine as described above, therefore, only the perpendicular (vertical) components of the vibration modes of the floor need to be considered.

Consider, for example, a load cell 3(4) affixed at a position P(x, y) on an X-Y plane as shown in FIG. 4. The motion of the X-Y plane can be described in terms of the rotation around the X-axis, the rotation around the Y-axis and the motion along an axis (the Z-axis) perpendicular to both the X-axis and the Y-axis. The other modes of motion will not be discussed here because they are not detected by the load cell 3(4). Now, let the motion in the Z-direction caused by a rotary motion around the X-axis be denoted by B(t), that caused by a rotary motion around the Y-axis by A(t) and the motion in the direction of the Z-axis by C(t). Of the output signal from the load cell at position P, the component $V_P(t)$ contributed by the floor vibration is given as follows:

$$V_P(t) = xA(t) + yB(t) + C(t) \tag{1}$$

In order to obtain the values of A(t), B(t) and C(t), it is theoretically sufficient to detect the floor motion at three positions not in a collinear relationship and solve linear simultaneous equations with three unknowns. In practice, however, motion is detected at more than three positions because the output from each load sensor contains some measurement errors, and A(t), B(t) and C(t) are obtained preferably by a method of least squares. It is the floor vibration calculating means 13 that calculates the values of $V_P(t)$ from A(t), B(t) and C(t) by using (1).

FIG. 5 shows the structure of another CPU 9' which may be substituted for the CPU 9 shown in FIG. 2, being different therefrom in the following two aspects. Firstly, this CPU 9' additionally includes a cell sensitivity setting means 15 and a cell sensitivity correcting means 16. The cell sensitivity setting means 15 serves to preliminarily set a cell sensitivity ratio between the scale cells 3 and the dummy cells 4 on the basis of the loads on the dummy cells 4 (or $4_1$–$4_n$ in FIG. 1), the loads on the scale cells 3 (or $3_1$–$3_m$ in FIG. 1) and the spring constant of the scale and dummy cells 3 and 4. The cell sensitivity correcting means 16 is for using the cell sensitivity ratio set by the cell sensitivity setting means 15 to thereby correct the dummy signals D (or $D_1$–$D_n$) and generating cell sensitivity corrected signals $CS_1$–$CS_n$. Secondly, there are further provided a weight sensitivity calculating means 17 and a weight sensitivity correcting means 18, which are for correcting the changes in sensitivity to the floor vibrations due to changes in the applied load. The weight sensitivity calculating means 17 serves to calculate the weight sensitivity ratio between the scale and dummy cells 3 and 4 as it changes according to the weights of the objects X being weighed. The weight sensitivity correcting means 18 serves to use the weight sensitivity ratio calculated by the weight sensitivity calculating means 17 to correct the displacement signals $S_1$–$S_m$ outputted from the floor vibration calculating means 13 and to thereby generate weight sensitivity corrected signals $WS_1$–$WS_m$.

With reference still to FIG. 5, wherein components which are substantially identical to those shown in and explained with reference to FIG. 2 are indicated by the same numerals, cell sensitivity corrections are performed by the cell sensitivity correcting means 16, and the dummy signals $D_1$–$D_n$ are converted to the levels of the weight signals $W_1$–$W_m$ by means of the cell sensitivity setting means 15. These converted signals (or the cell sensitivity corrected signals $CS_1$–$CS_n$) are used by the floor vibration calculating means 13 to calculate the floor vibrations. Further, the weight sensitivity correcting means 18 carries out sensitivity corrections according to the weights of the objects applied to the scale cells $3_1$–$3_m$, thereby outputting weight sensitivity corrected signals $WS_1$–$WS_m$, which are used by the floor vibration correcting means $14_1$–$14_m$ to subtract the vibration components of the floor represented by the weight sensitivity corrected signals $WS_1$ $WS_m$ from the weight signals $W_1$–$W_m$, thereby obtaining vibration corrected weight signals $BS_1$–$BS_m$.

Corrections effected as explained above with reference to FIG. 5 can be more simply explained with reference to a model shown in FIG. 6 wherein the left-hand side and the right-hand side schematically represent a scale cell and a dummy cell, respectively. Let $M_0$ represent the load (as mass) on the free end of the dummy cell, $M_1$ represent the load (as mass) on the free end of the scale cell when carrying no object to be weighed, m represent the mass of an object to be weighed, and $k_0$ and $k_1$ be the spring constants respectively of the dummy and scale cells. If $x_0$, $x_1$ and $x_B$ represent the displacements respectively of the free end of the dummy and scale cells and the floor F, the equations of motions of the free ends of the cells can be expressed as follows:

$$(m+M_1)\ddot{x}_1 + k_1(x_1 - x_B) = 0 \tag{11}$$

$$M_0\ddot{x}_0 + k_0(x_0 - x_B) = 0 \tag{12}$$

Since each cell measures the relative displacement between the floor and its loaded end, (11) and (12) can be written as follows:

$$(m+M_1)\ddot{x}_{1B} + k_1 x_{1B} = -(m+M_1)\ddot{x}_B \tag{13}$$

$$M_0\ddot{x}_{0B} + k_0 x_{0B} = -M_0\ddot{x}_B \tag{14}$$

where $x_{1B} = x_1 - x_B$ and $x_{0B} = x_0 - x_B$.

The displacement of the floor is considered an input and the cell output is considered an output of a system. Then, a transmission function relating the system input and output can be obtained from (13) and (14), and frequency characteristics $G_1(j\omega)$ and $G_0(j\omega)$ on the weighing side and the floor side become as follows:

$$|G_1(j\omega)|=|\omega^2/(\omega_1^2-\omega^2)| \quad (15)$$

$$|G_0(j\omega)|=|\omega^2/(\omega_0^2-\omega^2)| \quad (16)$$

where $\omega_1^2=k_1/(m+M_1)$ and $\omega_0^2=k_0/M_0$, that is, $\omega_1$ is the characteristic frequency of the scale cell and $\omega_0$ is the characteristic frequency of the dummy cell.

The sensitivity ratio $\beta$ between the scale cell side and the dummy cell side (with correction due to weight difference) is, therefore, $$\beta=|G_1(j\omega)/G_0(j\omega)|=|\omega_0^2-\omega^2)/(\omega_1^2-\omega^2)|=|(\omega_0^2/\omega_1^2)\{1-(\omega/\omega_0)^2\}/\{1-(\omega/\omega_1)^2\}| \quad (17)$$

If $1>>(\omega/\omega_0)^2$ and $1>>(\omega/\omega_1)^2$, or if the characteristic frequency is much higher than the frequency requiring correction both on the scale cell side and the dummy cell side, (17) becomes as follows:

$$\beta=\omega_0^2/\omega_1^2=\{1+(m/M_1)\}(k_0M_1/k_1M_0) \quad (18)$$

The second factor on the right-hand side of (18) represents the value of the sensitivity ratio between the two cells when $m=0$, that is, when there is no object being weighed. The first factor on the right-hand side of (18) represents the change in the sensitivity of the scale cell when the weight of the object (of mass m) is applied to the scale cell, that is, the weight sensitivity ratio between the two cells.

In practice, the hoppers attached to the scale and dummy cells are usually much heavier than the article batches that are dropped in for weighing, that is, $m<<M_1$. So, the cell sensitivity setting means 15 approximates $\beta$ by $k_0M_1/k_1M_0$, each factor of which is known or determinable, and the cell sensitivity correcting means 16 uses this approximate value of $\beta$ to correct the dummy signals $D_1-D_n$ to obtain the cell sensitivity corrected signals $CS_1-CS_n$. This may be schematically written as $CS_i=(1-k_0M_1/k_1M_0)D_i$ where $i=1-n$. Next, the floor vibration calculating means 13 uses (1) and $CS_i$ to calculate the effects of the floor vibrations at the m positions of the scale cells, outputting them as displacement signals $S_1-S_m$. Because the formula (18) for $\beta$ was approximated by the cell sensitivity setting means 15, as described above, these displacement signals are not "weight sensitivity correct" yet. In order to "weight sensitivity correct" the uncorrected displacement signals $S_1-S_m$, the weight sensitivity calculating means 17 receives uncorrected digital weight signals $W_1-W_m$ and calculates the second term on the first factor on the right-hand side of (18). The output (or the effect of weight correction obtained by the weight sensitivity calculating means 17) is combined with the "uncorrected" displacement signals $S_1-S_m$ by the weight sensitivity correcting means 18 to obtain weight sensitivity corrected signals $WS_1-WS_m$. This may be schematically written as $WS_j=(1-W_j/M_1)S_j$ where $j=1-m$. Finally, the floor vibration correcting means $14_1-14_m$, which may be digital subtractors, subtract the weight sensitivity corrected signals $WS_1-WS_m$ (representing cell sensitivity and weight sensitivity corrected floor vibrations at the positions of the scale cells) from the uncorrected digital weight signals $W_1-W_m$ to output vibration corrected weight signals $BS_1-BS_m$ (or $BS_j=W_j-WS_j$) which are used by the combination calculating means 20.

As a variation to the above, the cell sensitivity correcting means 16 and the weight sensitivity correcting means 18 may be connected to the output side of the digital filters $10_1-10_m$ for the weight signals such that one of the dummy cells 4 is used as a standard for correcting the sensitivities of the weight signals $W_1-W_m$ by converting them to the level of the dummy signals $D_1-D_n$ to thereby carry out the floor vibration corrections. In this situation, however, sensitivity corrected weight signals $W_1-W_m$ must be corrected again back to the level before the corrections.

As another variation to the above, the cell sensitivity correcting means 16 may be connected both to the sides of the weight signals and the dummy signals so as to be able to carry out cell sensitivity corrections not only between weight and dummy signals but also between weight signals and between dummy signals. In other words, the cell sensitivity and weight sensitivity correcting means 16 and 18 need only to be adapted to carry out sensitivity corrections according to at least one of either weight or dummy signals.

As explained above, the use of digital filters (as opposed to analog filters) is preferred also in all these examples both described above and to be described below because analog filters tend to have large fluctuations in their characteristics, but this invention is not limited to the use of digital filters. If analog filters are to be used instead of, or in addition to, the digital filters shown at $10_1-10_m$ and $11_1-11_n$, such analog filters are connected at 19 in FIG. 2.

FIG. 7 shows schematically an example of combinational weighing machine to which the present invention can be effectively applied. In FIG. 7, numeral 60 indicates a dispersion table adapted to be vibrated and serving to radially disperse articles to be weighed as they are dropped from above and to thereby supply them to a plural m-number of weighing units $61_1-61_m$ disposed radially around the periphery of the table 60. Each of the weighing units $61_1-61_m$ is provided with a dispersion feeder $62_i$ having an electromagnetic vibrator $62_{ai}$ and a trough $62_{bi}$, a pool hopper $63_i$, a pool hopper gate $64_i$, a weigh hopper $65_i$, a weigh hopper gate $66_i$, a scale cell $67_i$ and a hopper gate driver $68_i$, where i is an dummy index i=1-m. The weigh hoppers $65_1-65_m$ and the scale cells $67_1-67_m$ may be said to together form load sensors $41_1-41_m$. There is disposed below the load sensors $41_1-41_m$ a collector chute 69 in the shape of a conic or polygonal funnel for receiving weighed articles discharged from the weigh hoppers $65_1-65_m$ of the load sensors $41_1-41_m$. Numeral 70 indicates a base which is set on the same floor F. Since combinational weighing machines are well known and many structured as shown above have been described and sold commercially, the functions of each of these components will not be explained in detail herein.

FIG. 8 represents a signal processing system according to a second embodiment of the invention for a combinational weighing machine structured as shown in FIG. 7. It is to be noted that this processing system is importantly different from the system shown in FIG. 1 in that there are no load cells identified specifically as dummy cells. As explained above with reference to FIG. 1, objects delivered to the weigh hoppers $65_1-65_m$ are weighed by the scale cells $67_1-67_m$, and analog weight signals $W_1-W_m$ indicative of the weight values obtained thereby are outputted therefrom, amplified by amplifiers $43_1-43_m$, received by a multiplexer 42, selectively outputted therefrom to an analog-to-digital (A/D) converter 44 in response to a switch signal c received from a CPU 45, and converted into digital weight signals.

The CPU 45, like the CPUs 9 and 9' described above with reference to FIGS. 2 and 5, carries out vibration corrections and combinational calculations but by using only the digital weight signals $W_1-W_m$ because there are no dummy cells outputting dummy signals.

As shown in FIG. 9, the CPU 45 contains digital filters $46_1$–$46_m$. The weight signals $W_1$–$W_m$ which are selectively outputted from the multiplexer 42 and converted into digital signals by the A/D converter 44, are passed through a switching circuit 47 and corresponding one of the digital filters $46_1$–$46_m$ such that components with relatively high frequencies generated principally when objects to be weighed are put inside the weigh hoppers $65_1$–$65_m$ are eliminated.

Numeral 48 indicates a combination calculating means which functions like the one shown at 20 in FIGS. 2 and 5. Digital weight signals $W_1$–$W_m$ pass through floor vibration correcting means 50 (similar to the means $14_1$–$14_m$ described above) and are inputted into the combination calculating means 48 as vibration corrected weight signals $BS_1$–$BS_m$. Combinations of these vibration corrected weight values are calculated and particular one of them satisfying a preset criterion is selected. Suppose, for example, that the combination corresponding to the three load sensors $41_1$–$41_3$ are selected. The combination calculating means 48 outputs an open signal OS to cause the weighed objects to be dropped from the corresponding hoppers $65_1$–$65_3$ to the chute 69.

Normally, there are a plurality of load sensors that are not selected in a combination calculation. Let us assume that the load sensors $41_i$–$41_m$ were among those not selected in the preceding cycle. This means that weighed objects remain inside the weigh hoppers $65_i$–$65_m$ of these load sensors $41_i$–$41_m$ and hence no new objects are supplied into them from the corresponding pool hoppers $63_i$–$63_m$ for the next cycle of combinational calculations. As a result, no new vibrations will be caused to these weigh hoppers $65_i$–$65_m$. In other words, the corresponding load sensors $41_i$–$41_m$ are subjected only to the vibrations of the floor F. Thus, the vibration components of the weight signals $W_i$–$W_m$ shown in FIG. 9 become the same as those of the floor vibrations. It now goes without saying that the load sensors $41_i$–$41_m$ may include any of the load sensors $41_1$–$41_3$ which are selected.

Another function of the combination calculating means 48 is to treat those of the weight signals $W_i$–$W_m$ which were not selected in the preceding cycle of combinational calculations and output them as digital dummy signals $D_i$–$D_m$ to a floor vibration calculating means 49 for calculating the vibration mode of the floor on the basis of the vibration components of the received dummy signals $D_i$–$D_m$ to thereby calculate the vertical displacements of the floor at the positions of the load sensors $41_1$–$41_m$ and to output displacement signals $S_1$–$S_m$ indicative of the calculated displacements to the floor vibration correcting means 50.

The floor vibration correcting means 50 serves to use the received displacement signals $S_1$–$S_m$ to correct the weight signals $W_1$–$W_m$, that is, to subtract the effects of the floor vibrations represented by the displacement signals $S_1$–$S_m$ from the weight values of the weighed objects represented by the weight signals $W_1$–$W_m$, thereby eliminating the effects of low-frequency floor vibrations and generating and outputting vibration corrected weight signals $BS_1$–$BS_m$ representing vibration corrected weight values. The combination calculating means 48 receives these vibration corrected weight signals $BS_1$–$BS_m$ and outputs an open signal OS to those of the hopper gate drivers $68_1$–$68_m$ corresponding to selected ones of the load sensors $41_1$–$41_m$ by the combinational calculations, causing weighed objects to be discharged from the corresponding ones of the weigh hoppers $65_1$–$65_m$ to the collector chute 69. This allows the cutoff frequencies of the filters $46_1$–$46_m$ to be set relatively high and reduces the time required for the combinational calculations. The method of calculating the vertical displacements was already explained above with reference to the weighing machine according to the first embodiment of the invention and hence will not be repeated here.

FIG. 10 shows a portion of another CPU similar to the CPU 45 shown in FIG. 9 but different therefrom in that it incorporates means for selecting a preferred combination of scale cells not selected in the preceding cycle of combinational calculation for the purpose of detecting the floor vibration. For the convenience of disclosure, comparable components are indicated by the same numerals in FIG. 10 as used in FIG. 9.

As is well known, not all weighing units of a combinational weighing machine participate in combinational calculations in every cycle. FIG. 10 indicates that the total number of weighing units of this combination weighing machine is m. If p ($\leq$m) is the number of the weighing units which participated in the preceding cycle of combinational calculations, weigh hoppers (as shown at $65_1$–$65_m$ in FIG. 7) of the (m–p) remaining weighing units which did not participate in the preceding cycle of combinational calculations do not receive a new article batch from their corresponding pool hoppers $63_1$–$63_m$. Thus, as explained briefly above, these (m–p) weigh hoppers do not undergo mechanical vibrations, except in response to the vibration of the floor F. The vibration components of weight signals from these (m–p) weighing units (or the scale cells associated with them) are indicated as D in FIG. 10 to represent detection signals outputted from the combination calculating means 48 and received by the floor vibration calculating means 49 which generates vertical displacement signals S representing the vertical displacements of the floor at the positions of these weighing units 61. The floor vibration correcting means 50 serves to subtract the effects of the floor vibration from the weight signals to output corrected weight signals $BS_1$–$BS_m$, as explained above with reference to FIG. 9. Suppose a combination of k (k$\leq$m) of these corrected weight signals $BS_1$–$BS_m$ were selected in the next cycle of combinational calculations. FIG. 10 shows k selection signals OS being outputted from the combination calculating means 48 to be received by corresponding ones of the gates $66_1$–$66_m$.

As explained above with reference to FIG. 4, the mode of vibration of the floor F can be obtained by studying the motion of the floor F at three points not in a collinear relationship, or not lying on a single straight line. As also explained above, however, the difference between the true displacement of the floor and a displacement value calculated by the floor vibration calculating means 49, as explained above, may become significantly large, depending on the relative positions of the three weighing units 61 selected for determining the floor vibration.

According to an embodiment of this invention, the CPU 45 includes a memory device 49a for storing the patterns of combinations of the weighing units 61 which make this error (or the difference) $\alpha$ small between the floor displacement $S_m$ as calculated by the floor vibration calculating means 49 as explained above and the "true" floor displacement $S_t$. Explained more in detail, three or more of the weighing units 61 are selected first for detecting the floor vibration, and the vibration mode of the floor is calculated by the floor vibration calculating means 49 from the vibration components of the weight signals outputted from these weighing units on the assumption that these vibration components do not include any detection errors. The true floor displacements $S_t$ at the positions of these weighing units 61 are calculated from these vibration components. Next, the vibration mode of the floor F is calculated by the floor vibration calculating means 49 on the basis of the floor vibration components including errors, and floor displacement $S_m$ at the positions of the weighing units 61 are calculated.

Consider, for example, a combinational weighing machine with 14 weighing units 61-1–61-14 arranged in a circle as shown in FIG. 11. Suppose, for example, that three mutually adjacent weighing units 61-1, 61-2 and 61-3, forming a triangular area 201 on the floor F, have been selected for determining the effects of floor vibration. If these weighing units have errors +1, −1 and +1 (in an arbitrary unit), respectively, the error α in the measurement by the weighing unit 61-9, which is oppositely positioned from these three selected weighing units, becomes 39.16 (in the same unit) because of its relatively large distance from the triangular area 201. In other words, such a combination pattern should be avoided for the correction of the floor vibration. If three mutually separated weighing units 61-1, 61-5 and 61-10 forming a triangular area 202 on the floor F, are selected, by contrast, and if these weighing units have the same errors as above, the errors α for all weighing units are less than 2 (in the same unit). For practical application, only those of the combinations of the weighing units 61 for which the errors for all weighing units 61 are less than 3, for example, may be considered "allowed", and these allowed patterns of combinations are stored in the memory device 49a as allowable patterns.

Of the allowable patterns stored in the memory device 49a, a particular combination of the weighing units 61, none of which participated in the preceding cycle of combinational calculations, is selected for the detection of floor vibration by a selecting means 49b so as to minimize the error. FIG. 12 shows this process by a flow chart where the number of weighing units 61 is assumed to be m, combinations of the weighing units 61 selectable as a result of combinational calculation will be indicated by $C_i$ where i (=1–q) represents the order of priority ($C_1$ being the most preferred according to the criterion for the selection, $C_2$ being the second most favorable combination, and so forth) and q indicates the number of patterns which satisfies the minimum accuracy condition against the target weight value. The pattern of weighing units 61 to be used for correcting the effects of floor vibration when pattern $C_i$ has been selected is indicated by $V_i$ (i=1–q) and the patterns that can be selected in the next cycle are indicated by $P_j$ (where j indicates the order of priority and j=1–r).

With reference to the flow chart of FIG. 12, the most preferred combination pattern $C_1$ according to the combinational calculations in the preceding cycle is considered first (Step 1). Next, a corresponding pattern $V_1$ of weighing units 61 for correcting the effects of the floor vibration is obtained by combining weighing units 61 not included in the selected combination pattern $C_1$ (Step 2). It is then examined whether the number of the weighing units 61 selected for the correction is greater than a certain predefined maximum value (such as 5, if m=10) (Step 3). If it is (YES in Step 3), it is concluded that the calculated error α in the floor vibration is not large and the combination pattern $C_1$ is selected and articles are discharged from the weigh hoppers 65 in this combination (Step 11).

If the number of the weighing units 61 selected for correcting the effects of vibration is less than the specified number, that is, if it is equal to 3 which is the minimum number required or 4 (NO in Step 3), the most desirable of the selectable patterns ($P_1$) for detecting the floor vibration, that is, the pattern with the smallest error, is selected (Step 4). It is then examined whether this most desirable selectable pattern $P_1$ includes $V_1$ (Step 5). If $P_1$ includes $V_1$ (YES in Step 5), $V_1$ is selected and the weighing units in pattern $C_1$ are discharged (Step 11). If $P_1$ does not include $V_1$ (No in Step 5), the next most desirable selectable pattern $P_2$ is selected (Step 6), and this is repeated until the lowest order of priority j=q is reached (Step 7).

If a selectable pattern $P_j$ cannot be found by this process (YES in Step 7), the next most desirable combination $C_2$ is selected (Step 8). This is repeated until the lowest priority order i=q is reached (Step 9). When a correction pattern $V_i$ is selected, the weighing units 61 in the selected combination $C_i$ are discharged (Step 11). If the minimum accuracy requirement is not satisfied (YES in Step 9), there is no combinational calculation (Step 10).

Experiments were carried out with a combinational weighing machine with 14 weighing units 61-1–61-14 distributed evenly in a circle as shown in FIG. 11. Examples of selectable patterns P for correcting the effects of floor vibration with error α less than 3 times the errors in the individual weighing units were as will be described below.

First, situations where three weighing units have been selected were investigated. The error α was less than 2 times when the pattern (described in terms of the three intervals between the mutually adjacent pairs of weighing units) was (4,5,5) as shown at 202 in FIG. 11. The error α was less than 3 times when the pattern was of any of the following six types: (4,4,6), (3,5,6), (3,6,5), (3,4,7), (3,7,4) and (2,6,6). Next, situations where four weighing units have been selected were studied. The error α was less than 2 times when the pattern was of any of the following seventeen types: (1,3,5,5), (1,4,4,5), (1,4,5,4), (1,5,3,5), (1,5,4,4), (1,5,5,3), (2,2,5,5), (2,3,4,5), (2,3,5,4), (2,4,3,5), (2,4,4,4), (2,4,5,3), (2,5,3,4), (2,5,4,3), (3,3,3,5), (3,3,4,4) and (3,4,3,4), of which the last pattern is shown at 203 in FIG. 11. The error α was less than 3 times when the pattern was of any of the following nineteen types: (1,3,6,4), (1,4,6,3), (2,3,6,3), (2,5,2,5), (1,2,5,6), (1,3,4,6), (1,4,3,6), (1,6,3,4), (1,6,4,3), (1,6,5,2), (2,2,4,6), (2,2,6,4), (2,3,3,6), (2,6,3,3), (1,2,6,5), (1,3,7,3), (1,5,6,2), (2,4,2,6), and (1,6,6,1).

This example, however, is not intended to limit the scope of the invention. For example, a combination pattern for correcting the effects of floor vibration may be selected before a combinational calculation is carried out. By such a method, combinational calculations are carried by excluding these pre-selected weighing units. As another example, weighing units which were not selected in two successive combinational calculations may be used to detect the effects of floor vibration. As a further example, floor displacements at the positions of the weighing units need not be obtained by first calculating the vibration mode of the floor from the weight signals from a selected combination of weighing units. Instead, the floor displacements may be calculated from an average of vibration components outputted from such combination of weighing units.

In summary, combination patterns of weighing units are selected from a memory device such that the difference between the vertical floor displacements and real displacements will be small. With vibration-detecting weighing units thus selected from those which were not selected in the preceding combinational calculations, effects of floor vibration can be accurately removed from measured weight signals.

FIG. 13 shows the structure of another CPU 45' which may be substituted for the CPU 45 shown in FIG. 9, being different therefrom in the following two aspects. Firstly, the CPU 45' additionally includes a cell sensitivity setting means 55 and a cell sensitivity correcting means 56. The cell sensitivity setting means 55 serves to preliminarily set a cell sensitivity ratio among the scale cells $67_1$–$67_m$ on the basis of the spring constant of the scale cells $67_1$–$67_m$ and the loads on the scale cells $67_1$–$67_m$ when no objects to be weighed are in the corresponding weigh hoppers $65_i$–$65_m$. The cell sensitivity correcting means 56 is for using the cell sensitivity ratio set by the cell sensitivity setting means 55 to thereby correct the dummy signals $D_i$–$D_m$ and generating cell sensitivity corrected signals $CS_i$–$CS_n$. Secondly, there are further provided a weight sensitivity calculating means 57 and a weight sensitivity correcting means 58, which are for correcting the changes in sensitivity to the floor vibrations due to changes in the applied load. The functions of these additional means, as well as the correction formulas used thereby, have been described above with reference to FIG. 5 except the dummy signals $D_i$–$D_m$ according to this embodiment of the invention are not from cells specifically designated as dummy cells but from those of the scale cells which were not selected in the preceding cycle of combinational calculations. Thus, they will not be described here repeatedly. It now goes without saying that any of the cells can serve both as a scale cell and a dummy cell and that $\omega_1 = \omega_0$ in such a situation.

Advantages of using digital filters (as opposed to analog filters) have also been discussed above with reference to FIGS. 2 and 5. If analog filters are to be used instead of, or in addition to, the digital filters $46_1$–$46_m$ in connection with the second embodiment of the invention, such analog filters are connected at 49 in FIG. 8.

It is to be reminded that the disclosure given above for the second embodiment of the invention can be applied also to combinational weighing machines having weighing units arranged linearly, instead of in a circular formation.

Another signal processing system according to a third embodiment of the invention is described next with reference to FIG. 14. For simplicity, this signal processing system is described as applied not to a combinational weighing machine with a plurality of weighing units but only to a combination of one weighing unit 81 having a weigh hopper 82 and a scale cell 83 and a vibration-detecting cell 84 which may be an equivalent of a dummy cell shown in FIG. 1 or one of the scale cells shown in FIG. 8 not selected in the preceding cycle of combinational calculations. In other words, this signal processing system described in FIG. 14 may be interpreted as being applied to a part of a combinational weighing machine.

When an object X to be weighed is placed inside the weigh hopper 82, the scale cell 83 outputs an analog weight signal W. The vibration-detecting cell 84 is attached through a frame FR to the same floor F as the scale cell 83 and is adapted to output an analog floor vibration signal V indicative of the vibratory motion of the floor F. The signals W and V from these two cells 83 and 84 are amplified by amplifiers 85 and 86 and converted into digital signals by means of analog-to-digital (A/D) converters 87 and 88, respectively. The digitalized weight and floor vibration signals W and V are received by a CPU 89 provided with digital filters 90 and 91 for removing therefrom high-frequency vibration components introduced mainly when the object X is loaded, a floor vibration correcting means 92 for removing the digital floor vibration signal V from the digital weight signal W, a repeating means 93 to be described below and a repetition frequency setting means 94 for setting the number of repetitions for the repeating means 93. The floor vibration correcting means 92 includes a cell sensitivity correcting means 95 for correcting the sensitivity difference of the cells 83 and 84 with respect to the floor vibrations by adjusting the signal level of the floor vibration signal V, a weight sensitivity correcting means 96 for correcting the sensitivity of the scale cell 83 caused by the application of the load due to the object X, and a subtracting means 97 for subtracting the digital floor vibration signal V from the digital weight signal W to thereby output a vibration-corrected weight signal W indicative of the weight (as mass) m of the object X with the effects of the floor vibrations removed. The cell sensitivity correcting means 95 and the weight sensitivity correcting means 96 may alternatively be adapted to adjust the signal level of the digital weight signal W to correct the sensitivity difference of the cells 83 and 84 with respect to the floor vibrations or that against changes in the load applied thereon.

The repeating means 93 is for inputting into the weight sensitivity correcting means 96 the weight m of the object x outputted from the subtracting means 97 and causing the weight sensitivity correction of the scale cell 83 repeated by the number of times specified by the repetition frequency setting means 94 (say, twice).

Next will be explained the method of correcting the effect of floor vibrations by using the floor vibration correcting means 92 structured as described above. As the object X is placed inside the weigh hopper 82, the analog weight signal w outputted from the scale cell 83 indicative of the weight of the object X is amplified by the amplifier 85 and then passed through the A/D converter 87 to be converted into a digital signal. Subsequently, this digital weight signal W is received by the CPU 89, passed through the digital filter 90 to have relatively high-frequency vibration components removed therefrom and inputted into the floor vibration correcting means 92. At the same time, the analog floor vibration signal V outputted from the vibration-detecting cell 84 is amplified by the amplifier 86 and then converted into a digital signal by passing through the A/D converter 88. This digital floor vibration signal is inputted into the CPU 89, passed through the digital filter 91 and inputted into the floor vibration correcting means 92 after relatively high-frequency vibration components are removed.

Of the signals W and V thus inputted into the floor vibration correcting means 92, the digital floor vibration signal V has its level adjusted by the cell sensitivity correcting means 95 and the sensitivity difference of the cells 83 and 84 with respect to the floor vibrations is corrected. Next, the weight sensitivity correcting means 96 serves to correct, on the basis of the digital weight signal W, the sensitivity difference of the cells 83 and 84 due to application of the weight of the object X. Finally, the sensitivity corrected digital floor vibration signal V is subtracted by the subtracting means 97 from the digital weight signal W to thereby generate and output a vibration corrected signal W indicative of the mass m of the object X. The corrected weight signal $W_c(t)$ thus obtained by the operation of the floor vibration correcting means 92 can be expressed as follows:

$$W_c(t) = W(t) - K\{(M+m)/M\}V(t) \qquad (20)$$

where W(t) is the output from the scale cell (weight signal) before the correction, K is the sensitivity ratio between the cells, M is the initial load on the scale cell, and m is the weight of the object to be weighed. In the above, the factor (M+m)/M represents the weight sensitivity ratio between the cells 83 and 84.

As is clear from (20), the scale cell 83 is subjected not only to its initial load M but also to the weight m of the object X, but the vibration-detecting cell 84 is not subjected to such an additional load. When the object X is loaded, therefore, the sensitivity against the floor vibrations becomes (M+m)/M times greater for the scale cell 83 as compared to the vibration-detecting cell 84. In other words, a correction due to the mass m of the object X becomes desirable.

The mass m, however, is not of a preliminarily known value but is a target value to be determined. In other words, its value is not determined at the time of the correction operations. Thus, the weight sensitivity of the scale cell 83 is not corrected at once, but by a feedback process whereby the vibration component V is first detected by the vibration-detecting cell 84, the corrected weight signal $W_c(t)$ is calculated by the floor vibration correcting means 92 by (20) and the corrected weight signal $W_c(t)$ thus obtained is then fed back into the weight sensitivity correcting means 96. This feedback process is repeated by the repetition number set by the repetition frequency setting means 94, such as twice, to improve the accuracy of weight sensitivity correction.

Although the cell sensitivity correcting means 95 is provided in the example described above with reference to FIG. 14, it may be omitted if the cell sensitivity difference between the two cells 83 and 84 is negligibly small. Although FIG. 14 shows an embodiment with one scale cell and one vibration-detecting cell, this embodiment of the invention is applicable equally well to a situation with one or more scale cells and a plurality of vibration-detection cells such that the vibration mode of the floor is determined on the basis of the vibration components of the floor detected by the vibration-detection cells to calculate the vertical displacements of the floor at the position of each of the scale cells.

FIG. 15 is a block diagram of still another signal processing system according to a fourth embodiment of the invention which is similar in part to the system described above with reference to FIG. 14. So, the components therein which are substantially identical to corresponding ones shown in FIG. 14 are indicated by the same numerals and will not be explained again in detail.

The CPU 89' for the system shown in FIG. 15 is different from the CPU 89 of FIG. 14 firstly in that it includes a first zero-point adjusting means 103 and a second zero-point adjusting means 104 for carrying out a zero-point adjustment respectively on the weight signal W and the floor vibration signal V digitalized by the digital filters 90 and 91 and outputting weight component W(t) corresponding to the weight m of the object X and floor vibration component V(t) corresponding to the floor vibrations. These components W(t) and V(t) are received by a floor vibration correcting means 102 for correcting the floor vibration component according to a formula to be described below to thereby output the mass m of the object X.

The first zero-point adjusting means 103 is for detecting the weight signal level when the weight m of the object X is not being applied, either during a specially set zero-detecting time period before the day's weighing operation is started or during a regular weighing operation, storing it as the zero-level and subtracting this zero-level from the weight signal W outputted from the scale cell 83 loaded with the object X to thereby obtain a zero-adjusted weight signal, that is, the weight component W(t) corresponding to the weight m of the object X. The second zero-point adjusting means 104 is for passing the floor vibration signal V outputted from the vibration-detecting cell 84 during such a specially set zero-detecting time period through a strong filter, storing its output as the zero-level, and subtracting this zero-level from the floor vibration signal V to thereby obtain a zero-adjusted floor vibration signal, or the vibration component V(t) corresponding to the floor vibrations.

The floor vibration correcting means 102 includes a cell sensitivity setting means 105, an initial load setting means 106 and a weight calculating means 107. The cell sensitivity setting means 105 is for setting the sensitivity ratio K between the scale cell 83 when it is not loaded with any object and the vibration-detecting cell 84. The initial load setting means 106 is for setting the initial load M on the scale cell 83 when it is not loaded with any object. The weight calculating means 107 is for using the cell sensitivity ratio K set in the cell sensitivity setting means 105 and the initial load M stored in the initial load setting means 106 to calculate the mass m of the object X. The sensitivity ratio K and the initial load M are characteristic to the weighing machine and hence of known values.

The formula used by the weight calculating means 107 to calculate the weight (as mass) m of the object X is obtained by setting the left-hand side of (20) equal to m. This is because, as (20) is used repeatedly by initially setting m equal to an appropriate initial value, the left-hand side of (20), or the corrected value $W_c(t)$, eventually approaches the value to be treated as m. Thus, $$m = W(t) - K\{(M+m)/M\}V(t) \qquad (21)$$
$$= W(t) - KV(t) - (K/M)mV(t) \quad \text{or}$$
$$\{1 + (K/M)V(t)\}m = W(t) - KV(t) \quad \text{Thus,}$$
$$m = \{W(t) - KV(t)\}/\{1 + (K/M)V(t)\}$$

where, as explained above, W(t) is the output from the scale cell after the zero-point adjustment (or weight component) and V(t) is the floor vibration component.

Next, the method of floor vibration correction by a system thus structured will be explained. First, the digital weight signal W before the object X is placed in the weigh hopper 82 (for example, during a specially set zero-detecting time period before the day's continuous weighing operation is started or even during a regular weighing operation) is inputted into the first zero-point adjusting means 103 and its signal level is detected and stored as the zero-level. At the same time, the digital vibration detecting signal V outputted from the vibration-detecting cell 84 is inputted into the second zero-point adjusting means 104 so as to be passed through a strong filter therein. The output therefrom is stored as the zero-level. Next, the sensitivity ratio K between the scale cell 83 when it is not loaded with any object and the vibration-detecting cell 84 is inputted into and stored in the cell sensitivity setting means 105. At the same time, the initial load M of the scale cell 83 when it is not loaded with any object is inputted into and stored in the initial load setting means 106.

If a weighing operation is started thereafter, an object X to be weighed is received by the weigh hopper 82, and the analog weight signal outputted from the scale cell 83 is amplified by the amplifier 85 and converted by the A/D converted 87 into a digital weight signal W. This digital weight signal is then inputted into the CPU 89' and, after its relatively high-frequency vibration components are removed by the digital filter 90, is passed through the first zero-point adjusting means 103. The weight component W(t) corresponding to the weight m of the object X after the zero-point adjustment is then inputted into the weight calculating means 107 of the floor vibration correcting means 102.

At the same time, the analog floor vibration signal V outputted from the vibration-detecting cell 84 is amplified by the amplifier 86 and then converted into a digital floor vibration signal by the A/D converter 88. This digital floor vibration signal is inputted into the CPU 89' and, after its relatively high-frequency vibration components are removed by the digital filter 91, is passed through the second zero-point adjusting means 104 to be inputted into the weight calculating means 107 as the floor vibration component V(t) after a zero-point adjustment. The weight calculating means 107 thereupon uses the earlier inputted values of the cell sensitivity ratio K and the initial load M on the scale cell 83 to perform the calculation according to (21) to output the value of the weight m of the object X.

This embodiment of the invention is advantageous in that the mass m of a loaded object X can be immediately calculated by a formula by using preliminarily inputted values of the initial load M and the sensitivity ratio K such that no time-consuming feedback process of repeating weight sensitivity correction is required. In other words, this embodiment of the invention makes it possible to carry out accurate weighing quickly by performing a weight value calculation only once by using preliminarily inputted constant values.

Although FIG. 15 shows an example with one scale cell and one vibration-detecting cell, this embodiment of the invention, too, is applicable equally well to situations with one or more scale cells and a plurality of vibration-detection cells such that the vibration mode of the floor is determined on the basis of the vibration components of the floor detected by the vibration-detection cells to calculate the vertical displacements of the floor at the position of each of the scale cells.

The invention has been described above with reference to only a limited number of examples, some with reference to a combinational weighing machine and some with reference to a weighing machine with only one scale cell, but the scope of the invention is not intended to be limited by the illustrated examples. The disclosure is intended to be interpreted broadly and many modifications and variations of what has been disclosed are intended to be included within the scope of the invention. As a background of this invention regarding correction of the effects of floor vibration on an output from a weighing machine, the reader is referred to a report entitled "New weighing System for Anti-Floor Vibration" by Y. Wakasa, et al., published in Proceeding of the 1993 JSME, International Conference on Advanced Mechatronics, Tokyo, Japan, August, 1993.

On the other hand, it is well known and understood by persons skilled in the art of combinational weighing that combinational weighers with more than 10 and as many as about 14 scale cells (as shown in FIG. 11) are commonly manufactured and sold while it is desirable to detect the vibrational mode of the floor with as few dummy cells as possible. Theoretically, three dummy cells are sufficient to determine the mode of vibrations of a two-dimensional floor but four dummy cells may be utilized for improved accuracy. Even if four dummy cells are provided, the number of scale cells is much greater than that of dummy cells, as a practical matter. Thus, although the descriptions with reference to FIGS. 1–5 said nothing of the relative magnitude of m (the number of scale cells) and n (the number of dummy cells), it is to be understood that m is a greater number than n in practically all cases of interest.

Similarly, it is well known among the persons skilled in the art of combinational weighing that when some of the weight signals from a combinational weigher are used as dummy signals from which the vibration mode of the floor is to be determined, as explained with reference to FIGS. 8–13, for example, the number of signals to serve as dummy signals is usually smaller than the number of signals which are selected in the previous cycle of combinational weighing. In other words, although the description of the invention given above said nothing of this numerical relationship, it is to be understood as a practical matter that the number of signals to be treated as dummy signals in FIGS. 8–13 is smaller than the number of the "participating" signals in the selected combination in almost all situations of interest.

What is claimed is:

1. A combinational weighing machine comprising:

a plurality of weighing units set on a same floor and adapted to weigh article batches and output weight signals indicative of the measured weights thereof;

a control unit for carrying out combinational calculation of said weight signals and causing said article batches to be discharged from a selected combination of said weighing units according to a predetermined criterion;

floor vibration calculating means for calculating vertical displacements of said floor at positions of said weighing units by determining a planar vibration mode of said floor determined from vibration components of the weight signals outputted from a smaller number of non-participating ones of said weighing units which did not participate in the preceding cycle of combinational calculation by said control unit, said smaller number being smaller than the number of said weighing units participating in said combinational calculation;

floor vibration correcting means for subtracting the vertical displacements of said floor calculated by said floor vibration calculating means from the weight signals from participating ones of said weighing units that participated in said combinational calculation by said control unit;

a memory device, said control unit causing to store in said memory device, for a combination of said weighing units, only combination patterns of said non-participating weighing units that reduce the difference between calculated vertical displacements of said floor obtained by said floor vibration calculating means and real vertical displacement of said floor; and selecting means for selecting one of said combination patterns from said memory means for said combination of weighing units.

2. The combinational weighing machine of claim 1 wherein said weighing units are arranged to form a circle and said combination patters do not include undesirable patterns with two of said weighing units next to each other.

3. The combinational weighing machine of claim 1 wherein said combination patterns are patterns having three of said non-selected weighing units.

4. In a combinational weighing machine having a plurality of load sensors adapted to be set on a same floor for weighing objects and outputting weight signals corresponding to the weights of said objects, carrying out cycles of combinational calculations to thereby select in each of said cycles a combination of said weight signals satisfying a preset criterion, and discharging objects weighed by those of said load sensors which outputted said selected combination of weight signals, the improvement wherein said combinational weighing machine further comprises:

floor vibration calculating means for treating as dummy signals a smaller number of said weight signals not selected in the preceding cycle of said combinational calculations, detecting planar vibration mode of said floor from a time-series of vibration components of said dummy signals and obtaining a time-series of vertical displacements of said floor at the positions of said scale cells, said smaller number being smaller than the number of said weigh signals participating in said combinational calculation; and floor vibration correcting means for removing said vibration components from said weight signal according to said displacement and thereby generating a vibration corrected weight signal.

5. A combinational weighing machine comprising:

a plurality of weighing units set on a same floor and adapted to weigh article batches and output weight signals indicative of the measured weights thereof;

a control unit for carrying out combinational calculation of said weight signals and causing said article batches to be discharged from a selected combination of said weighing units according to a predetermined criterion;

floor vibration calculating means for calculating vertical displacements of said floor at positions of said weighing units by determining a planar vibration mode of said floor determined from vibration components of a time-series of the weight signals outputted from non-participating ones of said weighing units which did not participate in the preceding cycle of combinational calculation by said control unit;

floor vibration correcting means for subtracting the vertical displacements of said floor calculated by said floor vibration calculating means from the weight signals from participating ones of said weighing units that participated in said combinational calculation by said control unit;

a memory device, said control unit causing to store in said memory device, for a combination of said weighing units, only combination patterns of said non-participating weighing units that reduce the difference between calculated vertical displacements of said floor obtained by said floor vibration calculating means and real vertical displacement of said floor; and selecting means for selecting one of said combination patterns from said memory means for said combination of weighing units.

6. A weighing machine comprising:

a scale cell for weighing an object and outputting a weight signal corresponding to the weight of said object;

a plurality of dummy cells adapted to be set on a same floor as said scale cell;

floor vibration calculating means for detecting planar vibration mode of said floor from vibration components of dummy signals outputted from said dummy cells and calculating vertical displacement of said floor at the position of said scale cell; and floor vibration correcting means for removing said vibration components from said weight signal according to said displacement and thereby generating a vibration corrected weight signal.

7. The weighing machine of claim 6 wherein said scale and dummy cells have spring constants associated therewith, and wherein said weighing machine further comprises:

cell sensitivity setting means for setting sensitivity ratio at least between said scale and dummy cells according to the load on said dummy cells, the load on said scale cell when not subjected to the weight of any object to be weighed, and said spring constants of said scale and dummy cells; and cell sensitivity correcting means for correcting at least said weight signal or said dummy signals according to said sensitivity ratio and thereby generating a cell sensitivity corrected signal.

8. The weighing machine of claim 6 further comprising:

weight sensitivity calculating means for calculating weight sensitivity ratio at least between said scale and dummy cells according to the weight of an object to be weighed on said scale cell; and weight sensitivity correcting means for correcting at least said weight signal or said dummy signals according to said weight sensitivity ratio and thereby generating a weight sensitivity corrected signal.

9. The weighing machine of claim 7 further comprising:

weight sensitivity calculating means for calculating weight sensitivity ratio at least between said scale and dummy cells according to the weight of an object to be weighed on said scale cell; and weight sensitivity correcting means for correcting at least said weight signal or said dummy signals according to said weight sensitivity ratio and thereby generating a weight sensitivity corrected signal.

10. The weighing machine of claim 6 wherein said floor vibration correcting means includes:

weight sensitivity correcting means for correcting difference in sensitivity between said scale cell and said dummy cells caused by the weight of said object applied to said scale cell to thereby obtain a corrected weight value; and repeating means for inputting said corrected weight value into said weight sensitivity correcting means and thereby repeating the correction by said weight sensitivity correcting means.

11. The weighing machine of claim 6 wherein said floor vibration correcting means includes:

cell sensitivity setting means for setting sensitivity ratio k between said scale cell when not subjected to the weight of any object to be weighed and said dummy cells;

initial load setting means for setting initial load M of said scale cell when not subjected to the weight of any object to be weighed; and weight calculating means for calculating a weight value m of said object according to $m=\{W(t)-KV(t)\}/\{1+(K/M)V(t)\}$ where $W(t)$ is said weight component and $V(t)$ is said vibration component.

12. The weighing machine of claim 6 wherein said scale cell is one of a larger number of scale cells than said dummy cells.

13. A weighing machine which operates in cycles, comprising:

scale cells each for weighing an object and outputting a weight signal corresponding to the weight of said object;

a plurality of dummy cells adapted to be set on a same floor as said scale cell;

floor vibration calculating means for detecting planar vibration mode of said floor from a time-series of vibration components of dummy signals outputted from said dummy cells and calculating a time-series of vertical displacements of said floor at the positions of said scale cells; and floor vibration correcting means for removing said vibration components from said weight signal according to said displacement and thereby generating a vibration corrected weight signal.

* * * * *